US008271425B2

(12) United States Patent
Matsuhara

(10) Patent No.: US 8,271,425 B2
(45) Date of Patent: Sep. 18, 2012

(54) IMAGE PROCESSING SYSTEM AND IMAGE PROCESSING DEVICE IMPLEMENTING A SPECIFIC IMAGE PROCESSING FUNCTION FOR EACH USER AS WELL AS A COMPUTER PROGRAM PRODUCT FOR THE SAME

(75) Inventor: Kenji Matsuhara, Kawanishi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 964 days.

(21) Appl. No.: 11/253,589

(22) Filed: Oct. 20, 2005

(65) Prior Publication Data
US 2007/0019229 A1     Jan. 25, 2007

(30) Foreign Application Priority Data

Jul. 21, 2005 (JP) ................................ 2005-211604

(51) Int. Cl.
*G06F 7/00* (2006.01)
(52) U.S. Cl. ..... 707/600; 707/3; 707/758; 707/E17.108; 709/227; 709/225; 709/209; 709/203; 382/311
(58) Field of Classification Search ................ 358/1.15, 358/1.13; 709/221, 230, 232; 710/15; 707/3, 707/600
See application file for complete search history.

(56) References Cited

U.S. PATENT DOCUMENTS

| 5,521,719 A * | 5/1996 | Yamada .......................... 358/438 |
| 5,805,297 A | 9/1998 | Furuya et al. |
| 5,969,826 A | 10/1999 | Dash et al. |
| 6,185,600 B1 | 2/2001 | Spence et al. |
| 6,624,905 B1 | 9/2003 | Ikegami et al. |
| 6,784,904 B2 | 8/2004 | Dow et al. |
| 6,883,040 B2 * | 4/2005 | Lee .................................. 710/15 |
| 6,976,084 B2 * | 12/2005 | Pineau et al. .................. 709/232 |
| 7,111,068 B2 * | 9/2006 | Akimoto et al. .............. 709/230 |
| 7,209,251 B2 * | 4/2007 | Hayashi ....................... 358/1.15 |
| 7,257,777 B1 * | 8/2007 | Kanevsky et al. ............ 715/794 |
| 7,594,178 B2 * | 9/2009 | Sakai ............................ 715/736 |
| 2002/0105677 A1 * | 8/2002 | Sato .............................. 358/1.15 |
| 2003/0169337 A1 * | 9/2003 | Wilson et al. ................. 348/156 |

(Continued)

FOREIGN PATENT DOCUMENTS
JP     5-224837     9/1993
(Continued)

OTHER PUBLICATIONS

Wolfgang et al, "Physlets, Coastal Carolina University", http://kingfish.coastal.edu/physics/physlets/, published on Feb. 23, 2004.*

*Primary Examiner* — Matthew Bella
*Assistant Examiner* — Mekonen Bekele
(74) *Attorney, Agent, or Firm* — Buchanan Ingersoll & Rooney PC

(57) ABSTRACT

In an image processing system including a plurality of image processing devices, each image processing device includes an authenticating unit, a function implementing unit and a function specifying unit. The authenticating unit performs user authentication. The function specifying unit specifies a specific image processing function in another image processing device for each of the users. The function implementing unit implements the specific image processing function for the user already logging in the authenticating unit.

19 Claims, 35 Drawing Sheets

U.S. PATENT DOCUMENTS

| | | | |
|---|---|---|---|
| 2003/0184793 A1* | 10/2003 | Pineau | 358/1.15 |
| 2003/0214666 A1 | 11/2003 | Osada | |
| 2005/0036168 A1* | 2/2005 | Shoji et al. | 358/1.15 |
| 2005/0154629 A1* | 7/2005 | Matsuda et al. | 705/10 |
| 2005/0165759 A1* | 7/2005 | Sakai | 707/3 |
| 2007/0165854 A1* | 7/2007 | Higashi et al. | 380/212 |
| 2007/0250390 A1* | 10/2007 | Lee et al. | 705/14 |
| 2008/0183680 A1* | 7/2008 | Meynier et al. | 707/3 |

FOREIGN PATENT DOCUMENTS

| | | | |
|---|---|---|---|
| JP | 10-003472 | * | 1/1998 |
| JP | 10003472 A | * | 1/1998 |
| JP | 2001-147815 | * | 5/2001 |
| JP | 2001147815 A | * | 5/2001 |
| JP | 2002-366327 | | 12/2002 |
| JP | 2003-076552 | * | 3/2003 |
| JP | 2003076552 A | * | 3/2003 |
| JP | 2003-132029 | * | 5/2003 |
| JP | 2003132029 A | * | 5/2003 |
| JP | 2003-216430 A | | 7/2003 |
| JP | 2003-241928 A | | 8/2003 |
| JP | 2003-271387 | * | 9/2003 |
| JP | 2003-271387 A | | 9/2003 |
| JP | 2003-330732 | * | 11/2003 |

* cited by examiner

FIG.7

LOG-IN TIME INFORMATION

| USER NAME | LOG-IN TIMES |
|---|---|
| Tanaka | 1 |
| Yamada | 8 |
| Suzuki | 23 |
| ⋮ | ⋮ |

FIG.8

USED FUNCTION INFORMATION

| USER NAME | FUNCTION 1 | FUNCTION 2 | TIMES OF USE |
|---|---|---|---|
| Tanaka | | BASIC | 1 |
| | COPY | ORIGINAL - COPY | 0 |
| | | PHOTO/DENSITY | 0 |
| | | APPLICATION SETTING | 0 |
| | SCAN | READ MODE SELECTION | 0 |
| | | DESTINATION | 0 |
| | | APPLICATION SETTING | 0 |
| | FAX | ONE-TOUCH | 0 |
| | | QUALITY/ZOOM | 0 |
| | | DIAL INPUT | 0 |
| | | COMMUNICATION MENU | 0 |

FIG.9

LOG-IN TIME INTEGRATED INFORMATION

| USER NAME | MFP | LOG-IN TIMES |
|---|---|---|
| Tanaka | MFP100A | 1 |
| | MFP100B | 21 |
| | : | : |
| Yamada | MFP100A | 8 |
| | MFP100B | 15 |
| | : | : |
| Suzuki | MFP100A | 23 |
| | MFP100B | 1 |
| | : | : |
| | | |

FIG.10

CORRESPONDING APPLICATION INFORMATION

| FUNCTION 1 | FUNCTION 2 | FUNCTION 3 (CORRESPONDING APPLN) |
|---|---|---|
| SCAN FUNCTION | READ MODE SELECT FUNCTION | COMPACT PDF APPLN |
| | | PDF |
| | | TIFF |
| | | JPEG |
| | | SIZE SETTING |
| | | DENSITY SETTING |
| | DESTINATION SELECT FUNCTION | ADDRESS INPUT |
| | | INDEX LIST |
| | APPLICATION SETTING FUNCTION | UPSIDE-DOWN/INCLINATION CORRECTING APPLN |
| | | COMPRESSION APPLN |
| | | ENCRYPTION APPLN |
| | | E-MAIL NOTICE |

FIG.11

USED FUNCTION INFORMATION (MFP100B)

| USER NAME | FUNCTION 1 | FUNCTION 2 | TIMES OF USE |
|---|---|---|---|
| Tanaka | COPY | BASIC | 16 |
| | | ORIGINAL – COPY | 10 |
| | | PHOTO/DENSITY | 2 |
| | | APPLICATION SETTING | 1 |
| | SCAN | READ MODE SELECTION | 20 |
| | | DESTINATION | 3 |
| | | APPLICATION SETTING | 0 |
| | FAX | ONE-TOUCH | 6 |
| | | QUALITY/ZOOM | 0 |
| | | DIAL INPUT | 0 |
| | | COMMUNICATION MENU | 1 |

IMAGE PROCESSING SYSTEM AND IMAGE PROCESSING DEVICE IMPLEMENTING A SPECIFIC IMAGE PROCESSING FUNCTION FOR EACH USER AS WELL AS A COMPUTER PROGRAM PRODUCT FOR THE SAME

This application is based on Japanese Patent Application No. 2005-211604 filed with the Japan Patent Office on Jul. 21, 2005, the entire content of which is hereby incorporated by reference.

BACKGROUND OF THE INVENTION

1. Field of the Invention

The present invention relates to an image processing system and an image processing device, and particularly to an image processing system including a plurality of image processing devices, the image processing device and a computer program product for them.

2. Description of the Related Art

For changing or adding software in or to conventional MFPs (Multi-Function Peripherals) which are examples of image processing devices, such methods have been broadly employed that a service technician or administrator manually replaces ROMs (Read Only Memories) or performs an operation of reading the software from CD-ROMs (Compact Disc Read Only Memories). For reducing time and effort required for changing or adding the software, such manners have been employed in recent years that the MFP is connected to a server over a network, and required software is manually downloaded from the server to the MFP, or that the MFP accesses a server over the network, selects required software and downloads it.

Japanese Laid-Open Patent Publication Nos. 2003-216430 and 2003-271387 have disclosed techniques for automatically changing only the software required for the user. In these techniques, a frequency of use of software on a user's terminal is measured, and only software used with a high frequency is automatically downloaded to the user's terminal.

Japanese Laid-Open Patent Publication No. 2003-241928 has disclosed a technique relating to a system which downloads software of an additional function or feature related to a copying machine. In this technique, the copying machine accesses a dedicated server and thereby displays a list of capabilities. When a new function to be added to the copying machine is selected, software of the selected function is transferred to the copying machine.

In the case where an image processing system is formed of a plurality of image processing devices connected over a network, as is done in recent years, inconveniences may be imposed on users when the user uses the plurality of image processing devices. For example, when a user frequently using a certain function of a certain image processing device in the system attempts to use a different image processing device in the system for implementing the certain function by this different image processing device, the user must operate the different device in a manner different from that for the certain image processing device. More specifically, if the different image processing device does not have the certain function, the user must substitute another function for the certain function, or must manually downloads software for implementing the certain function. Even if the different image processing device has the certain function, the user must manually make setting as is frequently used.

Various techniques relating to the download of software have been disclosed for individual devices such as terminals and copying machines. However, no technique has been disclosed in connection with differences in implementation of function between the plurality of devices on the network.

SUMMARY OF THE INVENTION

The invention has been developed in view of the above circumstances, and an object of the invention is to provide an image processing system including a plurality of image processing devices, and particularly allowing a user to use any one of the image processing devices on a network without any inconvenience even when a difference is present in manner of implementing a desired function between the devices on the network.

An image processing system according to the invention includes a plurality of image processing devices. Each of the image processing devices includes an authenticating unit performing user authentication, a function implementing unit implementing a specific image processing function, and a function specifying unit specifying a specific image processing function in another image processing device for each of the users. The function implementing unit implements the specific image processing function for the user already logging in the authenticating unit.

According to an aspect of the invention, a computer program product for an image processing device forming an image processing system including the plurality of image processing devices, causes the image processing device to execute the steps of performing user authentication; specifying a specific image processing function in another image processing device of the image processing system for a user; and implementing the specific image processing function for the user already logging in according to the user authentication.

An image processing device according to the invention forms an image processing system including the plurality of image processing devices. The image processing device includes an authenticating unit performing user authentication; a function implementing unit implementing a specific image processing function, and a function specifying unit specifying a specific image processing function in another image processing device of the image processing system for each of the users. The function implementing unit implements the specific image processing function for the user already logging in the authenticating unit.

According to another aspect of the invention, a computer program product for an image processing system including a plurality of image processing devices, causes each of the image processing devices to execute the steps of performing user authentication, implementing a specific image processing function, executing the implemented image processing function, and specifying the specific image processing function in another image processing device for each of the users. The step of implementing the specific image processing function is a step of implementing the specific image processing function for the user in the log-in state.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 illustrates information stored in a user information storing unit of the MFP in FIG. 4.

FIG. 8 illustrates an example of information stored in the user information storing unit of the MFP in FIG. 4.

FIG. 9 illustrates information stored in a personal information managing unit of the server in FIG. 4.

FIG. 10 illustrates information stored in a download program selecting unit in the server in FIG. 4.

FIG. 11 illustrates another example of the information stored in the user information storing unit of the MFP in FIG. 4.

DESCRIPTION OF THE PREFERRED EMBODIMENTS

[First Embodiment]

Figure 1:
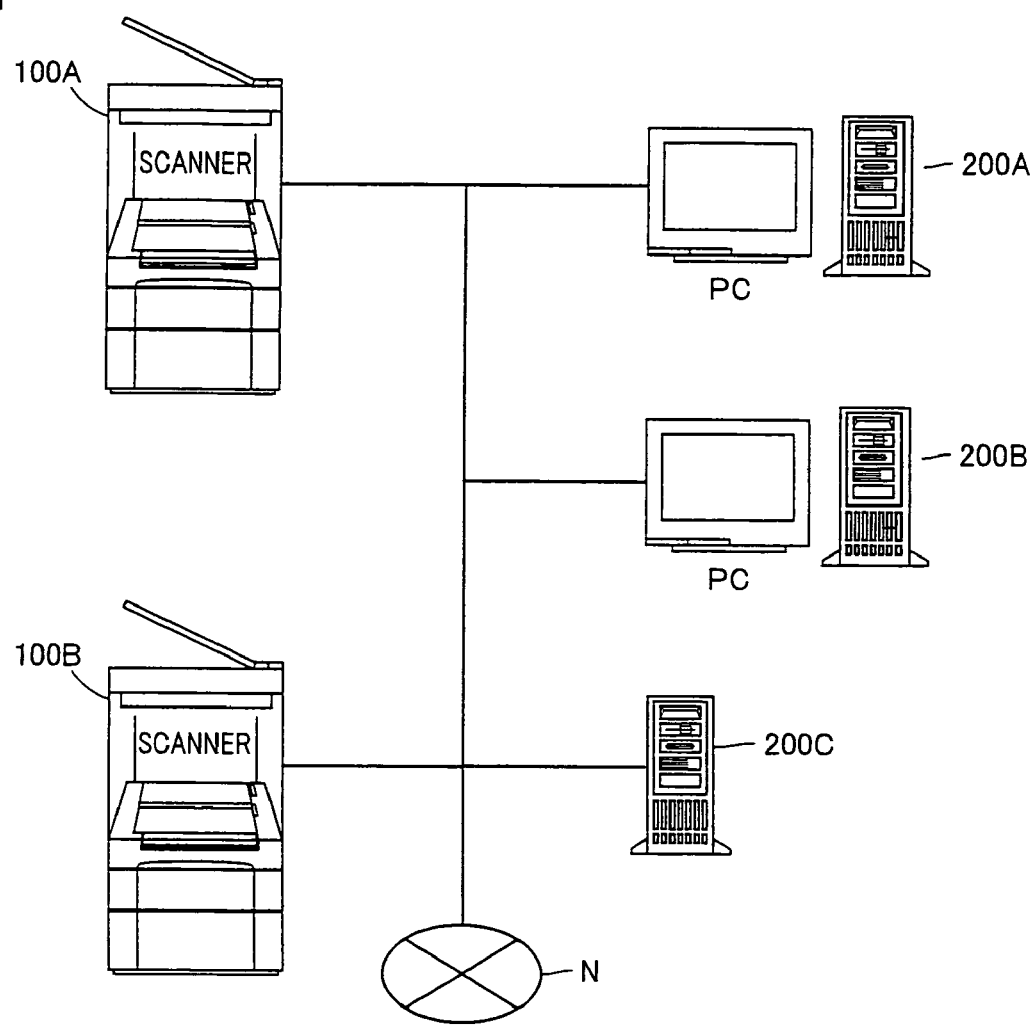
FIG. 1 shows a structure of an image processing system which is a first embodiment of the invention.

Referring to FIG. 1, an image processing system of a first embodiment includes MFPs 100A and 100B, personal computers (PCs) 200A and 200B, and a server 200C. MFPs 100A and 100B, personal computers 200A and 200B, and server 200C are connected over a network, which is connected to the Internet N. MFPs 100A and 100B can be connected to a line such as a PSTN (Public Switched Telephone Network) for facsimile transmission or the like.

A hardware structure of MFP 100A will now be described.

Figure 2:
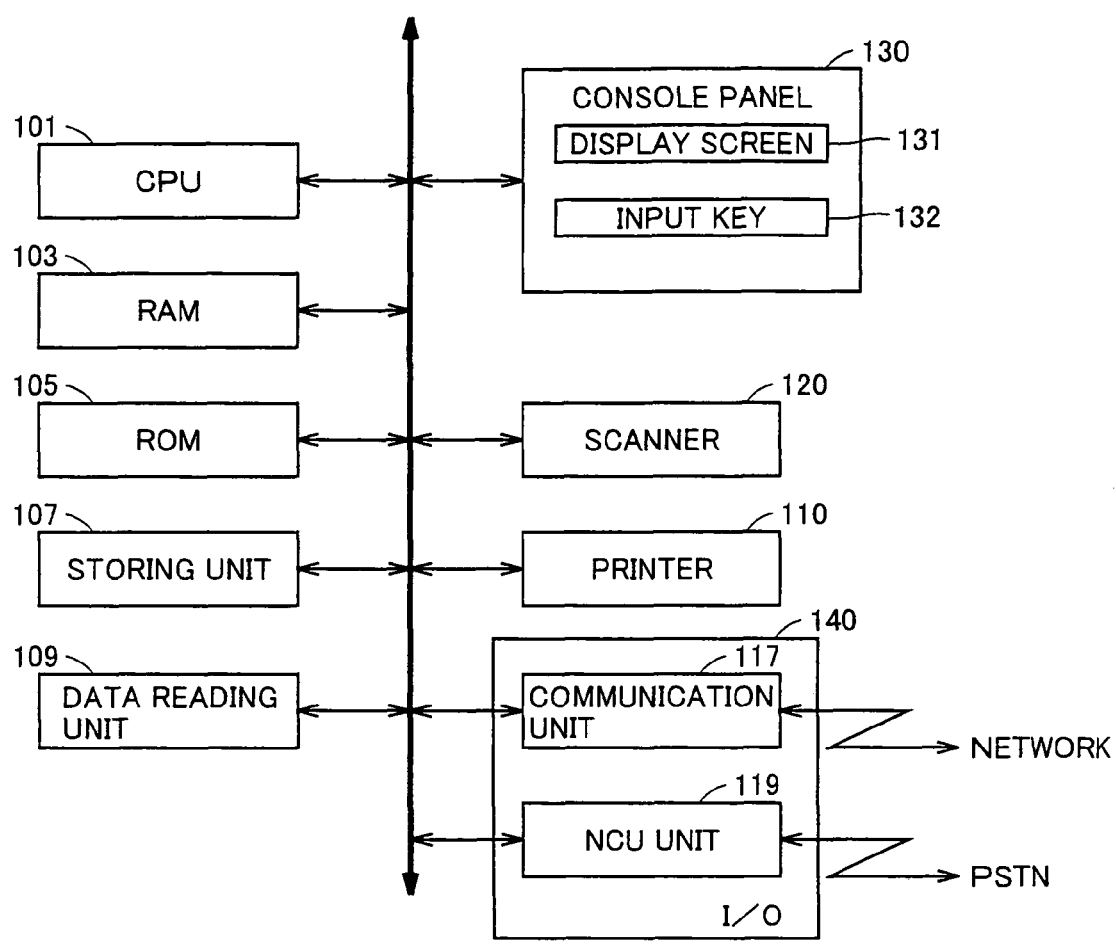
FIG. 2 schematically shows a hardware structure of a MFP in FIG. 1.

Referring to FIG. 2, MFP 100A includes a CPU 101, a RAM (Random Access Memory) 103 temporarily storing data, a ROM (Read Only Memory) 105 storing programs, constants and others, a storing unit 107 storing image data and others, a data reading unit 109 reading data recorded on a record medium such as a CD-ROM, a console panel 130 accepting a user's operation, a scanner 120 reading image data, a printer 110 printing image data on a sheet of paper, and an I/O (input/output) interface 140 which controls communications between components in MFP 100A as well as communications with devices outside MFP 100A. I/O interface 140 includes a communication unit 117 for connection to the network, and a NCU (Network Control Unit) for connected to the PSTN.

Console panel 130 includes a display screen 131 for displaying a state of MFP 100A and a menu of choices of commands to a user, and input keys 132. Display screen 131 and input keys 132 may be formed of a liquid crystal display and a touch panel arranged over it.

The hardware structure of MFP 100A shown in FIG. 1 has been described with reference to FIG. 2. MFP 100B has the substantially same hardware structure as MFP 100A, and therefore description thereof is not repeated.

A hardware structure of server 200C will be described.

Figure 3:
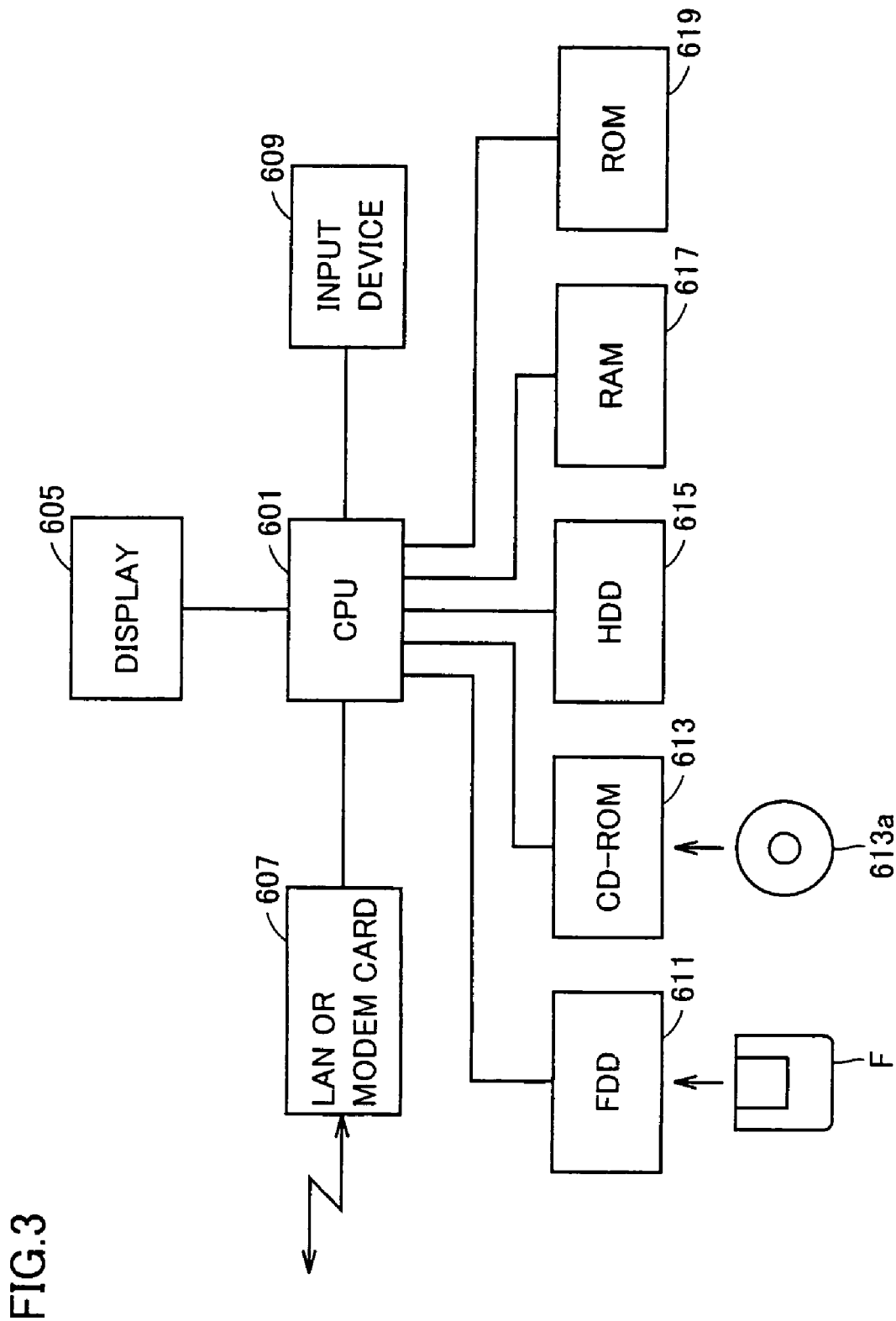
FIG. 3 schematically shows a hardware structure of a server in FIG. 1.

Referring to FIG. 3, server 200C includes a CPU 601 controlling the whole device, a display 605, a LAN (Local Area Network) card 607 (or a modem card) used for connection to the network or for external communications, an input device 609 formed of a keyboard, mouse and/or the like, a flexible disk drive 611, a CD-ROM drive 613, a hard disk drive 615, a RAM 617 and a ROM 619.

CPU 601 can read data such as a program recorded on a flexible disk F through flexible disk drive 611, and can read data such as a program recorded on a CD-ROM 613a through CD-ROM drive 613.

Description will now be given on a structure of the two MFPs (MFPs 100A and 100B) and server 200C included in the image processing system.

Figure 4:
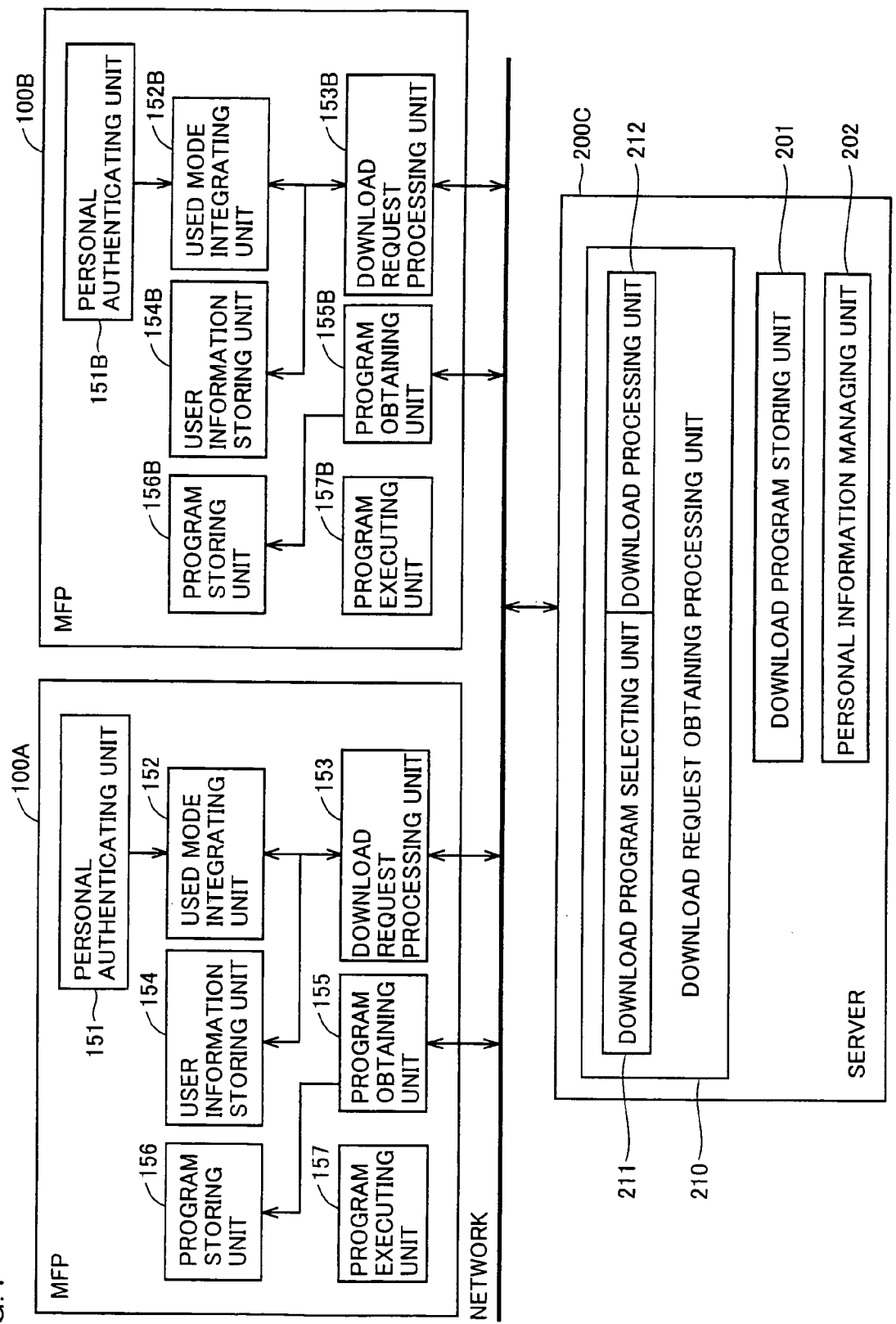
FIG. 4 is a block diagram of the two MFPs and the server in the image processing system in FIG. 1.

Referring to FIG. 4, MFP 100A includes a personal authenticating unit 151 performing personal authentication based on information entered by the user for log-in, a used mode integrating unit 152 causing a predetermined counter to execute counting based on a mode (i.e., "function 2" described later) used by the user, a download request processing unit 153 executing processes related to a request for downloading the program which is required for the function or feature corresponding to the user logging in the MFP, a user information storing unit 154 storing information related to the function used by the user, a program obtaining unit 155 executing processing for downloading the program, a program storing unit 156 storing various programs to be executed by MFP 100A, and a program executing unit 157 executing the program stored in program storing unit 156.

Similarly to MFP 100A, MFP 100B includes a personal authenticating unit 151B, a used mode integrating unit 152B, a download request processing unit 153B, a user information storing unit 154B, a program obtaining unit 155B, a program storing unit 156B and a program executing unit 157B.

Server 200C includes a download request obtaining processing unit 210 accepting download requests from MFPs 100A and 100B, a download program storing unit 201 storing a program for causing MFPs 100A and 100B to perform download, and a personal information managing unit 202 performing storage and others of information related to the users of MFPs such as MFP 100A and 100B connected over the network. Download request obtaining processing unit 210 includes a download program selecting unit 211 selecting the program from those stored in download program storing unit 201 for transmitting it to MFPs 100A and 100B, and a download processing unit 212 executing processing related to transmission of the program to MFPs 100A and 100B.

Description will now be given on a structure of the system formed in MFP 100A.

Figure 5:
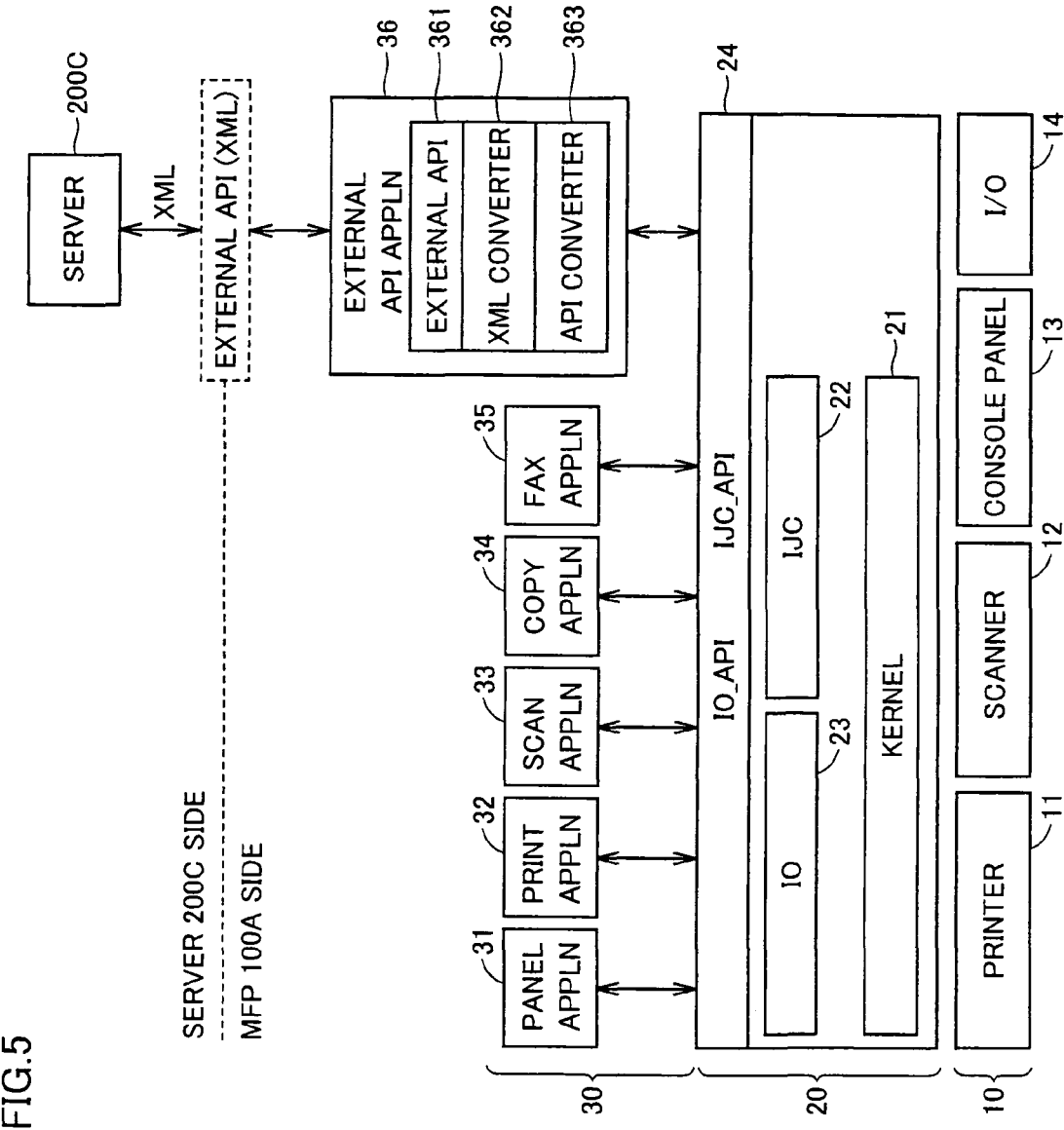
FIG. 5 schematically shows a structure of a system in the MFP shown in FIG. 1.

Referring to FIG. 5, the system of MFP 100A is formed of a device (hardware resource) 10, a control layer 20 and an application layer 30. Device 10 is located at the lowermost level of the system forming MFP 100A. Control layer 20 is a layer directly controlling device 10. Application layer 30 is located above control layer 20. MFP 100A is a digital copying machine formed of an architecture including device 10, control layer 20 and application layer 30, which are structurally systemized, and having a plurality of capabilities of executing image processing jobs such as scan, copy, print and facsimile jobs.

MFP 100A is connected to server 1 over the network such as a LAN (not shown in FIG. 5) as already described, and can transmit and receive various data items, e.g., with TCP/IP (Transmission Control Protocol/Internet Protocol).

Device 10 includes printer 110 serving as an image forming unit, scanner 120 serving as a reading unit, console panel 130 and I/O interface 140.

Printer 110 prints an image on a sheet of paper based on image data in a known electrophotographic manner.

Scanner 120 is a known device obtaining image data by reading an image on an original document placed or set thereon via a photoelectric conversion element such as a CCD (Charge Coupled Device).

Console panel 130 includes a display or the like providing the input keys and the display. Console panel 130 accepts the key input from the operator, and displays various messages and others on the display.

I/O interface 140 includes an interface device (e.g., NIC (Network Interface Card)) or the like required for communications of CPU 101, RAM 103, ROM 105 and the hard disk included in storing unit 107 to and from external devices.

Control layer 20 includes a kernel 21, a module (IJC: Image Job Controller) 22 for controlling operations of various devices, an interface module (IO: Input-Output) 23 for controlling communications with external devices, an IO/IJC API (Input-Output Image Job Controller Application Program Interface) 24, and operates as an OS (Operating System). IO/IJC API 24 is a combination of IO API and IJC API.

IO/IJC API 24 is an API (Application Program Interface) for providing capabilities of IJC 22 and IO 23 (i.e., a function of control layer 20) to each of applications 31-36 in application layer 30, and is a set or group of functional formulas which are invoked when the respective applications use these capabilities. More specifically, owing to these predefined functional formulas, IO/IJC API 24 has the function of accepting the processing requests related to the image processing from the respective applications.

Application layer 30 includes a plurality of applications for actually operating the devices by accessing IO/IJC API 24 (i.e., by calling a required functional formula(s) from the predefined functional formulas).

For example, a panel application 31 is an application for controlling a display operation of console panel 130. More specifically, when panel application 31 accepts the information, which is entered by a key operation on console panel 130, via control layer 20, it displays a message or the like based on the input information on the display of console panel 130. For example, when panel application 31 accepts the information indicating that a copy start key (i.e., a key for starting copying) on console panel 130 is depressed, it displays a message "BEING COPIED" on the display of console panel 130.

According to this embodiment, applications 31-36 in application layer 30 and CPU 101 executing these applications form the function implementing unit causing the devices to execute the image processing operation.

When print application 32 becomes active for execution of the print job, it converts externally provided print data in a PDL (Page Description Language) format into image data in a bitmap format, and causes printer 110 to perform print processing based on the image data.

When scan application 33 becomes active for execution of the scan job, it causes scanner 120 to read the original image (i.e., to perform the scanning) and obtain the image data.

When copy application 34 becomes active for the copy job execution, it causes scanner 120 to read the original image, and also causes printer 110 to perform the print processing based on the read image data.

When facsimile application 35 becomes active for executing the facsimile job, and particularly for the facsimile transmission, it causes, e.g., scanner 120 to read the original image, changes the obtained image data into data for the facsimile and transmits the data to a designated destination. For the facsimile reception, facsimile application 35 causes, e.g., printer 110 to execute the print processing based on externally received image data.

External API application 36 is a program controlling an operation of the device based on the processing request which is applied for image processing from an external device. This external API application 36 includes an external API 361, an XML converter 362 and an API converter 363.

External API 361 is an API for externally providing a function of control layer 20, and is a set or group of functional formulas which are called when a personal computer 200A, 200B calls the function of control layer 20. Thus, owing to the predefined functional formulas stored in external API 361, external API 361 has a function of accepting the processing request, which is provided from the external device and is related to the image processing.

External API 361 is open in advance to general external users (e.g., software developers), and the external users can develop software for using the functions of control layer 20 based on the open API.

More specifically, from the open API, the external user can determine commands, parameters and the like (such as commands, e.g., designating a job to be executed or indicating a job start, parameters indicating job execution conditions such as read size, resolution and others for scan jobs, parameters indicating job execution conditions such as a number of copy sheets for the copy job), which are prepared for the device control of MFP 100A, and can specifically determine a syntax for describing such commands or the like.

By using these commands, it is possible to transmit and receive a transmission request for the applications kept in MFP 100A.

External API 361 is formed of a collection of a plurality of predetermined functional formulas which are included in the functional formula group defined by IO/IJC API 24. For example, if a certain operation by device 10 is defined by functional formulas A, B and C among those stored in IO/IJC API 24, external API 361 is formed of a functional formula D which is a collection of functional formulas A, B and C (and thus serves as a functional formula for executing functional formulas A, B and C).

Owing to the fact that the above certain operation is represented by one functional formula, when the external user, who intends to execute the above certain operation by device 10, calls functional formula D from the external device, this calling substantially results in calling of functional formulas A, B and C. Thus, calling of functional formulas A, B and C does not require a plurality of commands. This facilitates handling of MFP 100A, and facilitates development of software relating to the foregoing operations of MFP 100A. When one functional formula represents one operation, the one functional formula is used for executing such one operation.

XML (eXtensible Markup Language) converter 362 extracts commands and others as information indicating processing requests from XML data transmitted from server 200C.

API converter 363 converts the extracted commands or the like (processing requests relating to the image processing and provided from server 200C) by XML converter 362 into a predetermined data format which is executable by control layer 20, and provides it to control layer 20. A known SOAP (Simple Object Access Protocol) is used as a communication protocol of the XML data between server 200C and external API application 36.

Description will now be given on a specific function application included in a part of applications of application layer 30 illustrated in FIG. 5.

Figure 6:
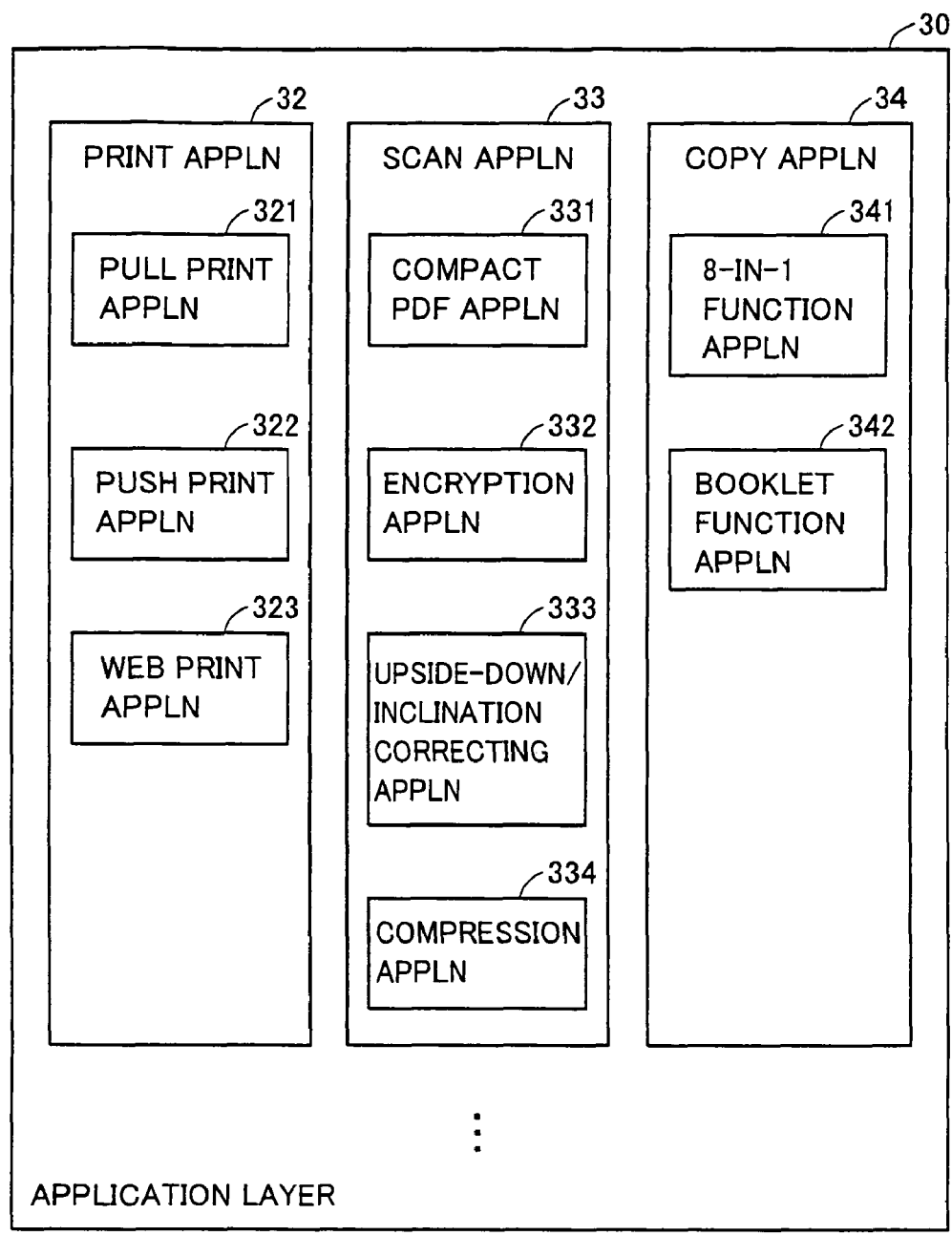
FIG. 6 schematically illustrates specific function applications included in a part of applications in an application layer shown in FIG. 5.

Referring to FIG. 6, print application 32 includes applications for the print operation by a printer 11, and more specifically includes a Pull print application 321 for performing desensitized printing, a Push print application 321 for performing sensitized printing and a Web print application 323 for printing Web pages on the Internet N.

Scan application 33 includes applications for image data which is obtained from a original image read by scanner 120, and more specifically includes a compact PDF (Portable Document Format) application 331 performing processing of decomposing the image data into a character part and an image part, optimizing each part and then combining these parts, an encrypting application 332 performing encryption, an upside-down and inclination correcting application 333 correcting an upside-down and/or inclined position, and a compression application 334 compressing a data size.

Copy application 34 includes 8-in-1 function application 341 reducing eight original documents and printing them on one sheet of paper, and a Booklet function application 342 performing double-sided copying of multiple original documents in a saddle stitching fashion.

Information stored in user information storing unit 154 of MFP 100A will now be described.

User information storing unit 154 stores the number of times that each user logged in its own device (MFP 100A in this embodiment) as illustrated as log-in time information in FIG. 7, and also stores the number of times that each user used each function of its own device, as illustrated as used function information in FIG. 8. In FIG. 8, the functions of MFP 100A are classified in "function 1" to express the devices in device 10 to which each function is related, and are also classified in "function 2" to express the specific functions implemented by the corresponding devices.

Other MFPs forming the image processing system likewise store information illustrated in FIGS. 7 and 8. Thus, user information storing unit 154B in MFP 100B likewise stores the information similar to that in FIGS. 7 and 8.

Personal information managing unit 202 in server 200C stores used function information items for each MFP forming the image processing system in a manner related to the information specifying each MFP.

Personal information managing unit 202 in server 200C stores the number of times that each user-logged in each of MFP, as illustrated as the log-in time integrated information in FIG. 9.

Further, as illustrated as corresponding application information in FIG. 10, download program selecting unit 211 in server 200C stores the functions classified as "function 2" in the used function information (see FIG. 8) as well as the applications for implementing the respective functions (i.e., the applications included in the application layers of the respective MFPs and the specific function applications (see FIG. 6) in a corresponding fashion. FIG. 10 illustrates correspondences relating to only the function of "SCAN" classified in "function 1" of the used function information (see FIG. 8).

Referring to FIG. 10, a "read mode selection" function has file format settings of "compact PDF application", "PDF", "TIFF" and "JPEG", and corresponds to conversion applications for conversion to these formats. Setting of read conditions corresponds to applications (not illustrated) of "size setting" and "density setting". The "destination selection" function corresponds to two applications of "address input" and "index list". The "application setting" function corresponds to the four applications of "upside-down and inclination correction", "compression application", "encryption application" and "E-mail notification".

The user information storing unit (user information storing unit 154 or 154B in MFP 100A or 100B, or the like) in each MFP and personal information managing unit 202 in server 200C store, as password managing information, a user name and a password for each user in a corresponding fashion.

When a user operates the MFP in the image processing system of the embodiment, CPU 101 of each MFP executes the following processing.

According to the image processing system of the embodiment, it is assumed that the user must log in each MFP for utilizing the MFP.

In the following description, the user frequently using MFP 100B (i.e., user frequently logging in MFP 100B) logs in MFP 100A and utilizes it, and CPU 101 of MFP 100A performs the processing as follows.

In the following example, information illustrated in FIG. 8 is stored as the used function information of a user "Tanaka" for MFP 100A, and description will be given on the processing performed when this user logs in MFP 100A. Further, it is assumed that the used function information of the user "Tanaka" is stored for MFP 100B as illustrated in FIG. 11.

Figure 12:
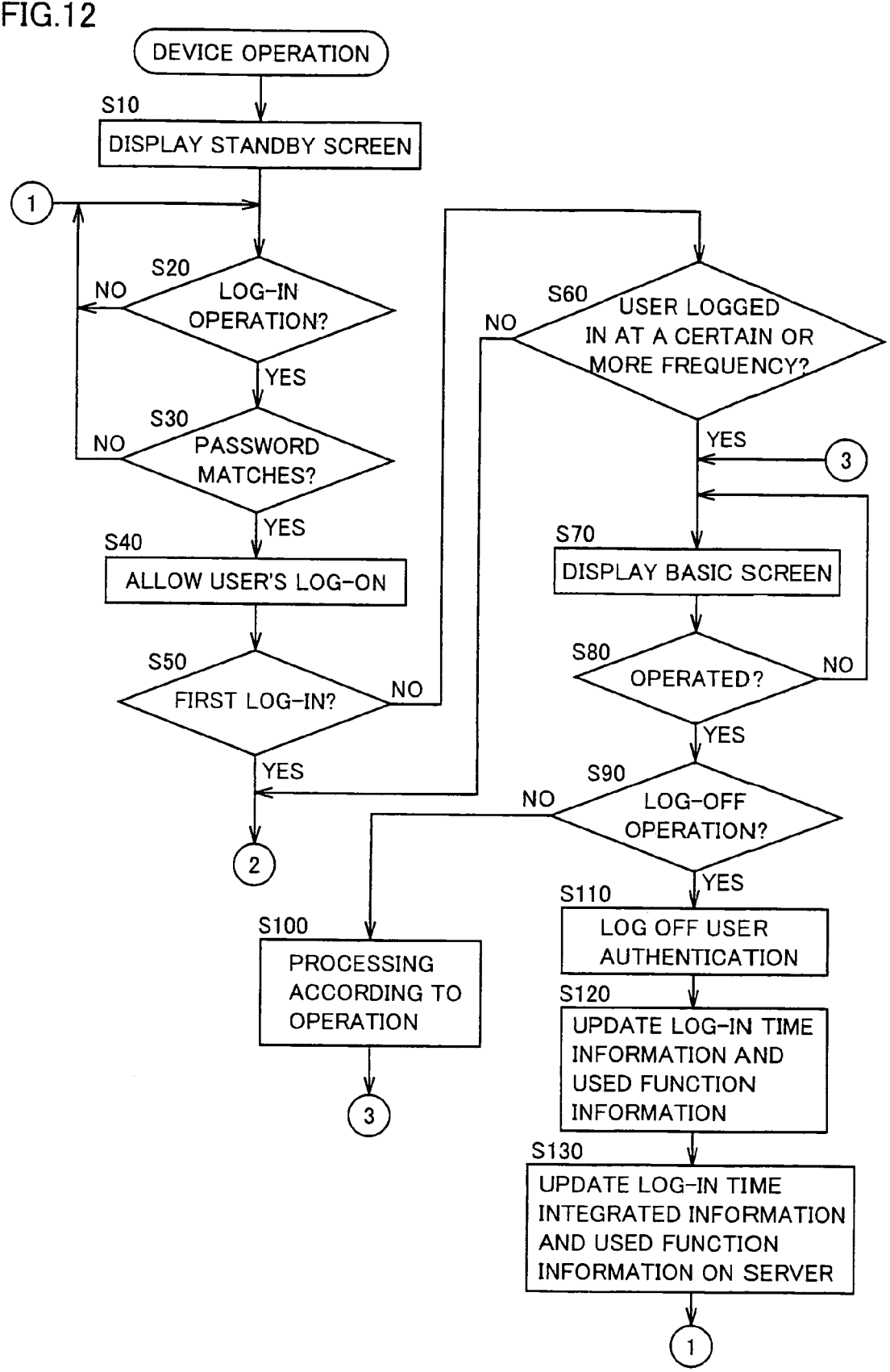
FIGS. 12, 13 and 14 are flowcharts of device execution processing executed by a CPU (Central Processing Unit) of the MFP in FIG. 2.
Figure 13:
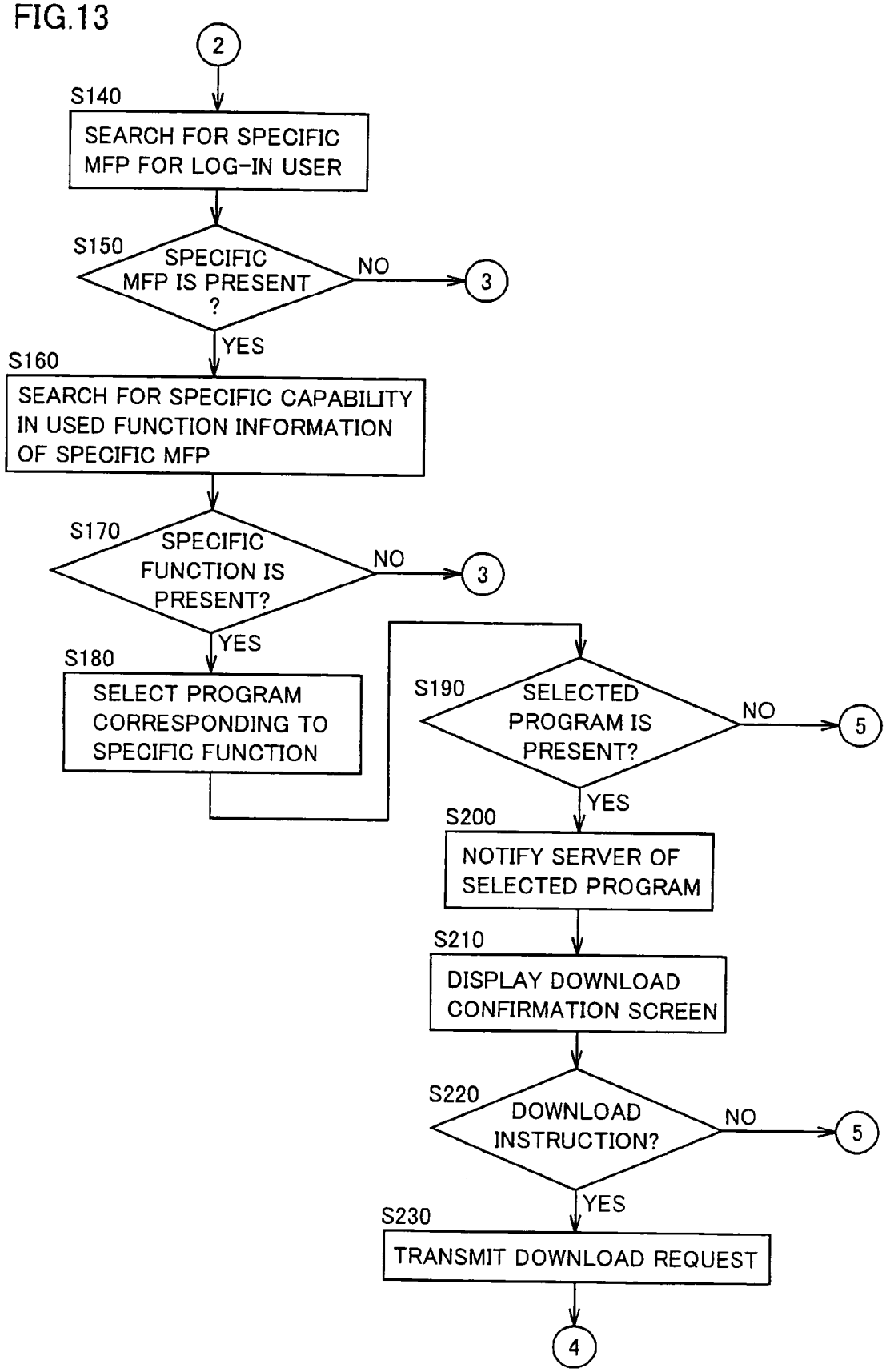
Figure 14:
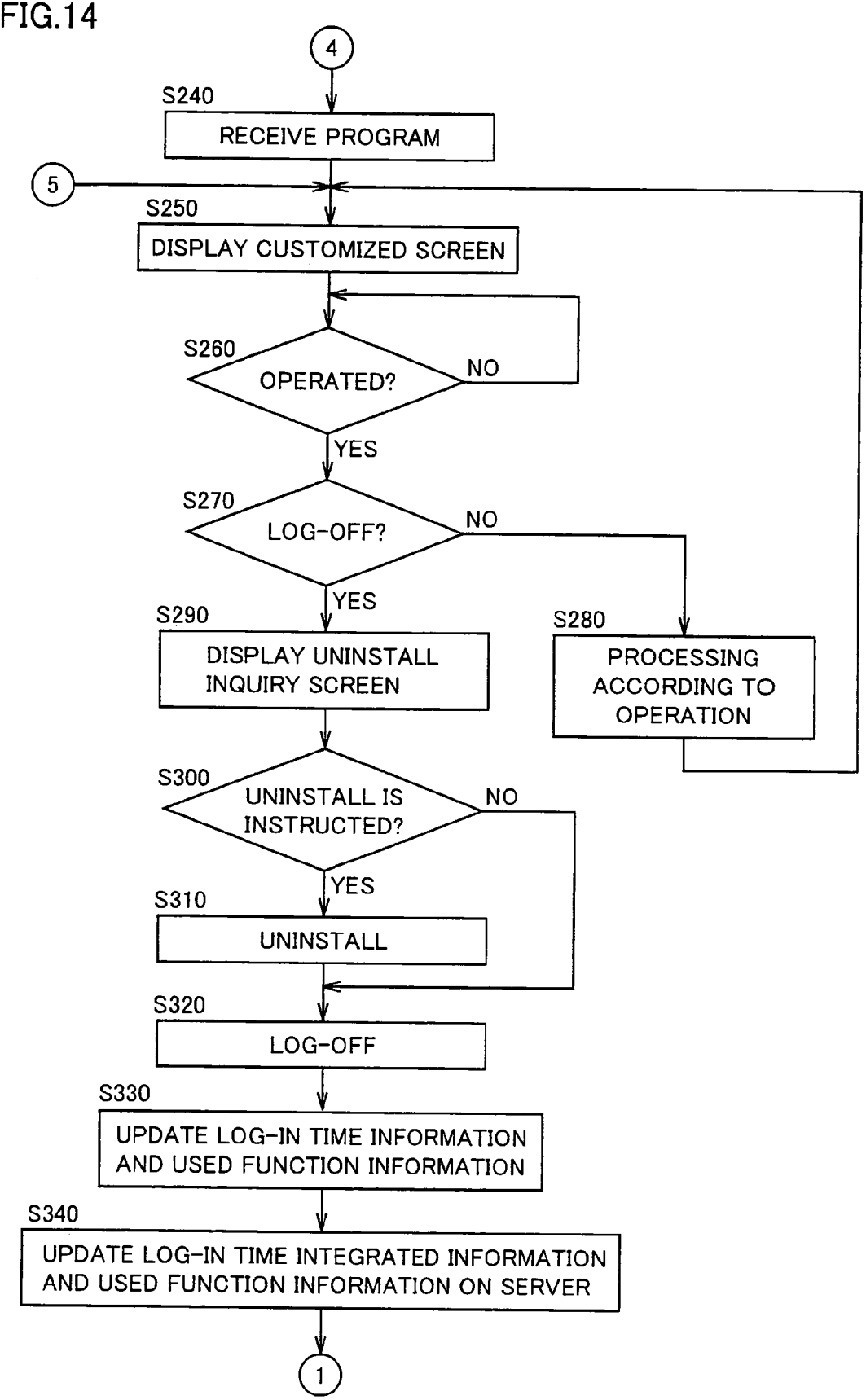

FIGS. 12-14 are flowcharts of device execution processing. The device execution processing is executed according to user's operations on input keys 132.

Figure 15:
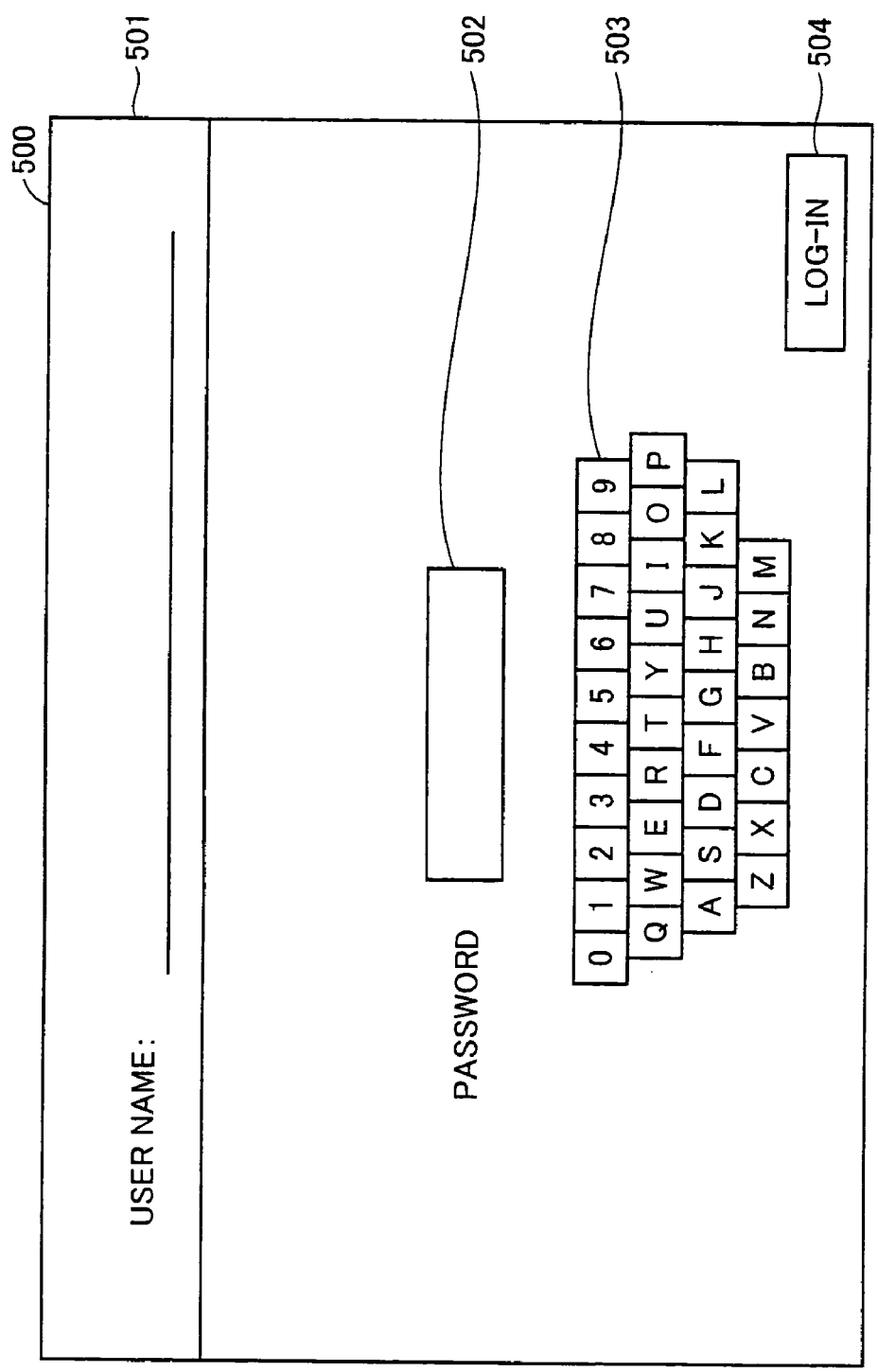
FIG. 15 shows an example of a standby screen displayed on a display screen in FIG. 2.

Referring to FIG. 12, CPU 101 displays a standby screen 500 shown in FIG. 15 on display screen 131, and enters a standby state.

As shown in FIG. 15, standby screen 500 represents a user name input field 501, a password input field 502 and an input key display field 503 formed of a plurality of touch keys corresponding to alphabets and numerals. The user appropriately operates touch keys included in input key display field 503, and thereby can enter the user name and the password in user name input field 501 and password input field 502, respectively.

Standby screen 500 also represents a log-in button 504 formed of a touch key. The user operates log-in button 504 to perform the log-in operation with the user name and password which are currently entered in user name input field 501 and password input field 502.

Then, CPU 101 determines in step S20 whether the user performed the log-in operation or not. When it determines that the log-in operation was performed, CPU 101 advances the process to step S30.

In step S30, CPU 101 determines whether the password entered in password input field 502 matches with the password which is stored in the password managing information of user information storing unit 154 in a fashion related to the user name entered in user name input field 501, or not. When it is determined that these passwords match with each other, the process proceeds to step S40. Otherwise, processing is performed, e.g., to display a message "password rejected" on display screen 131, and then the process returns to step S10.

In step S40, CPU 101 performs the processing of allowing log-on of the user of the user name entered in user name input field 501. Thereby, the user of the user name entered in user name input field 501 logs in MFP 100A. The user who already logged in MP 100A will be referred to as a "log-in user" hereinafter.

In next step S50, CPU 101 refers to the log-in time information of user information storing unit 154, and thereby determines whether the log-in user has logged in MFP 100A for the first time or not. When CPU 101 determines that this is the first log-in, and thus determines that the log-in times corresponding to the log-in name of the log-in user in user information storing unit 154 are zero, the process proceeds to step S140. When it is not the first log-in, the process proceeds to step S60.

In step S60, CPU 101 refers to the log-in time information in user information storing unit 154, and determines whether the log-in user logged in MFP 100A a predetermined number of times or more, or not. The predetermined number is, e.g., three and is generally determined such that execution of the log-in for this predetermined number of times or more can be considered as the frequent use of MFP 100A. This predetermined number can be appropriately changed according to the environments or the like of the system. When CPU 101 determines that the log-in was performed the predetermined number of times or more, the process proceeds to step S70. Otherwise, the process proceeds to step S140.

In step S70, CPU 101 displays a basic screen 700 (see FIG. 16) on display screen 131, and performs next processing in step S80.

Figure 16:
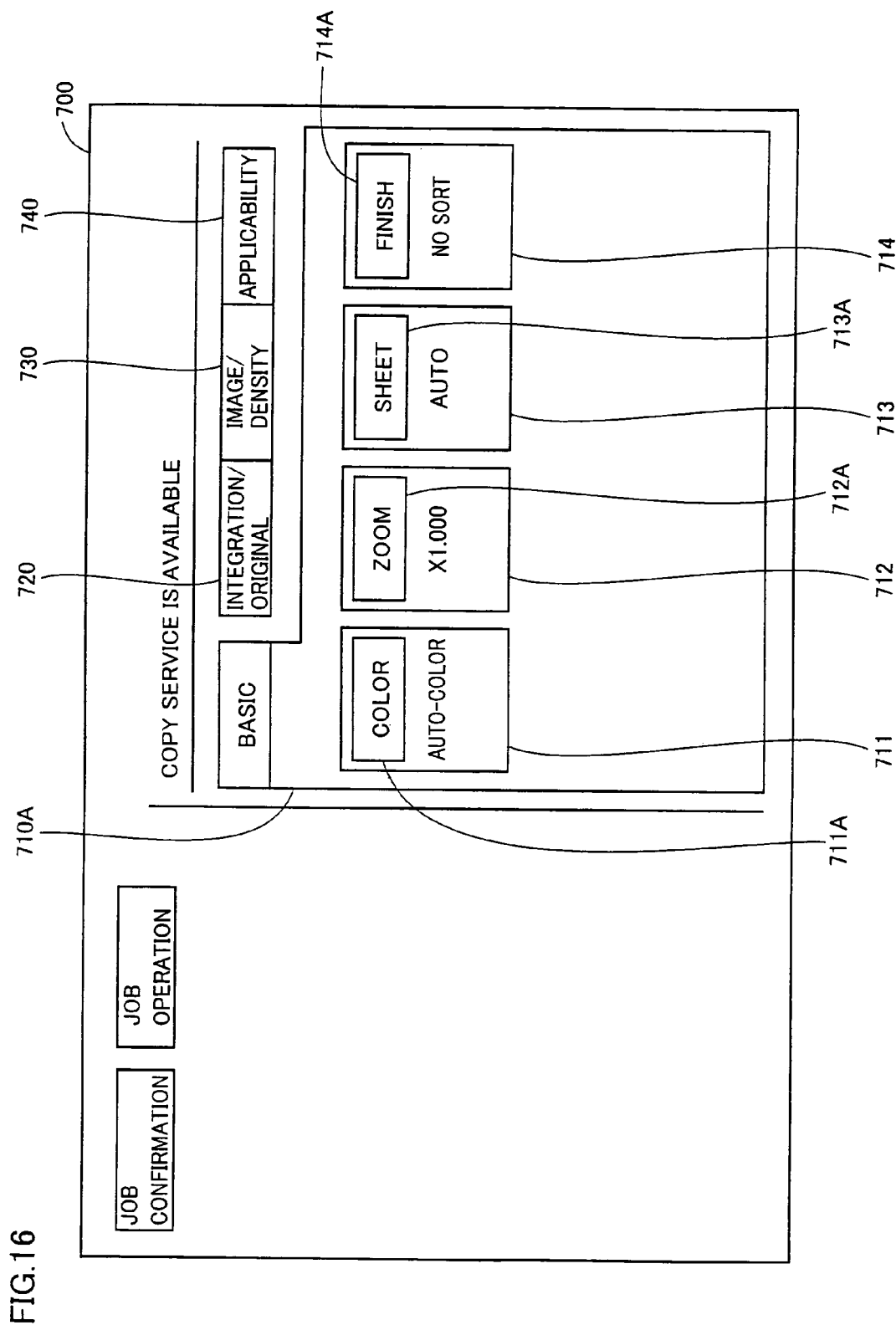
FIG. 16 shows an example of a basic screen displayed on the display screen in FIG. 2.

Referring to FIG. 16, basic screen 700 is an operation screen displayed when the copy operation is to be executed in MFP 100A. Basic screen 700 includes a basic setting display field 710A. Basic setting display field 710A represents a color setting display field 711, a magnification setting display field 712, a sheet setting display field 713 and a finish setting display field 714. A user can change setting details displayed in these fields by touching a color setting button 711A, a zoom or magnification setting button 712A, a sheet setting button 713A and a finish setting button 714A, respectively. As keys for various setting of the copy operation, basic screen 700 further represents a key 720 for setting "integration/original" menu, which is a menu for integrating and printing multiple pages of original documents on one sheet of paper, a key 730 for setting "image/density" menu relating to a density of the image to be printed and a key 740 for setting of applicabilities or application functions.

Referring to FIG. 12, CPU 101 determines in step S80 whether input keys 132 were operated by the user or not. When operated, CPU 101 advances the processing to step S90.

In step S90, CPU 101 determines whether the operation, which is effected on input keys 132 and is detected in step S80, is the operation for log-off or not. When it is the operation for log-off, the process proceeds to step S110. Otherwise, CPU 101 performs the processing corresponding to details of the operation in step S100, and then returns the processing to step S70. CPU 101 stores the details of the operations, which are performed for the processing in step S100, in a memory or the like of CPU 101 in question. These operations are the operations at the respective items of "function 2" of the used function information (see FIG. 8). The number of times that each operation has been executed is counted and stored until the user performs the log-off in step S110 which will be described later.

In step S110, CPU 101 performs the processing for log-off of the log-in user, and advances the process to step S120.

In step S120, CPU 101 updates the used function information in user information storing unit 154 by adding the number of times that the operation was executed after the log-on in step S40 and before the log-off in step S110. Further, CPU 101 updates the log-in time information in user information storing unit 154 by adding one to the number of log-in times of the user who logged off in step S110. Then, the process proceeds to step S130.

In step S130, CPU 101 transmits the used function information and log-in time information thus updated to server 200C, and thereby updates these information for MFP 100A in server 200C. Then, the process returns to step S10.

Referring to FIG. 13, CPU 101 in step S140 searches the log-in time integrated information in personal information managing unit 202 of server 200C for the specific MFPs corresponding to the log-in user. The specific MFPs are MFPs each of which a certain user logged in a predetermined number of times or more. When a certain user used a certain MFP the predetermined number of times, it can be deemed that the certain user frequently used the certain MFP. For example, the predetermined number is equal or close to three. This predetermined number of times can be appropriately changed according to the environments or the like of the system.

In step S150, CPU 101 determines from the result of searching in step S140 whether the specific MFP is present for the log-in user or not. When the specific MFP is present, the process proceeds to step S160. Otherwise, the process proceeds to step S70.

In step S160, CPU 101 searches for a specific function in the used function information for the log-in user of the specific MFP stored in personal information managing unit 202 of server 200C. The specific function is the function that was used most frequently in the used function information for each MFP of each user.

CPU 101 determines in step S170 from the result of searching in step S160 whether the specific function is present or not. When the specific function is present, the process proceeds to step S180. Otherwise, the process proceeds to step S70.

For example, if MFP 100B is found as the specific MFP for the user named as "Tanaka", CPU 101 searches in step S160 the used function information, which is stored in personal information managing unit 202 (and is the same as that illustrated in FIG. 11), for the specific function. In the used function information illustrated in FIG. 11, "read mode selection" in "function 2" is the function that was used most frequently. Thereby, CPU 101 determines in step S170 that the specific function is present.

CPU 101 selects in step S180 the application corresponding to the specific function. The information specifying the application corresponding to each function, which is listed as "function 2" in the used function information, is related as the corresponding application information as illustrated in FIG. 10. CPU 101 reads the corresponding application information stored in download program selecting unit 211 into RAM 103, and performs the selection based on the corresponding application information in step S180.

In step S190, CPU 101 determines in step S180 whether its own device (MFP 100A) has stored the selected program or not. When stored, CPU 101 advances the process to step S250. Otherwise, it advances the process to step S200.

In step S200, CPU 101 notifies server 200C of the application selected in step S180.

In next step S210, CPU 101 causes display screen 131 to display a screen by which the user can confirm that the user intends to download the program of the application for implementing the specific function to MFP 100A. This screen (download confirmation screen) is shown in FIG. 17.

Figure 17:
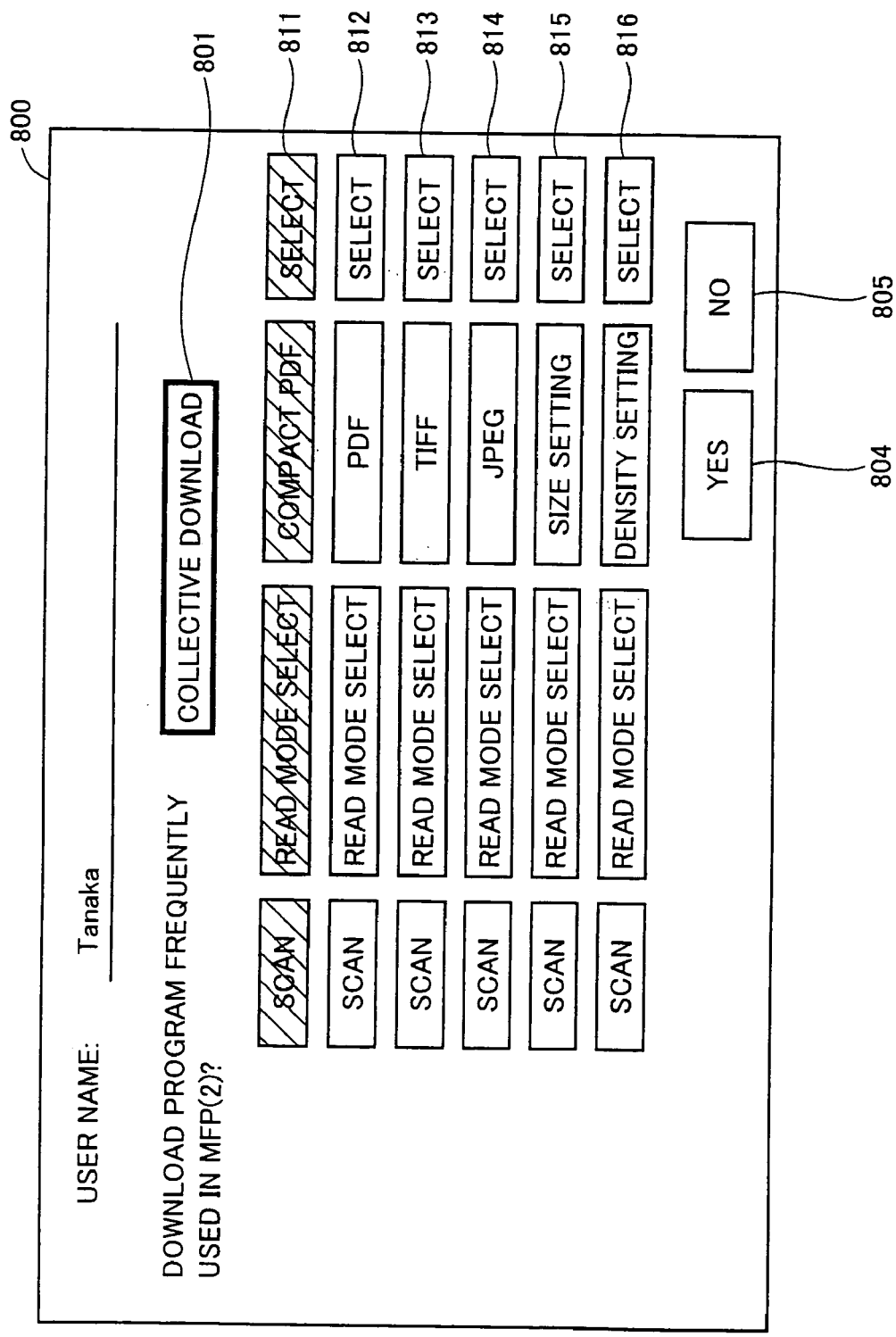
FIG. 17 shows an example of a download confirmation screen displayed on the display screen in FIG. 2.

Referring to FIG. 17, a download confirmation screen 800 represents names of the specific functions together with the user name. Download confirmation screen 800 also represents a collective download key 801 for instructing download of the programs, which correspond to all the applications included in the specific function, respectively, as well as select keys 811-816 for instructing the download of the programs corresponding to the respective functions (applications) included in the specific function.

FIG. 17 shows a state in which select key 811 as well as the program (application) and the name of function corresponding to this select key 811 are displayed in a color different from the others so that the program corresponding to this key (i.e., program corresponding to the application "compact PDF") is selected for download.

Download confirmation screen 800 represents keys 804 and 805. When key 804 is operated in such a state that collective download key 801 or at least one of select keys 811-816 is operated, i.e., in such a state that the download of at least one program is selected, CPU 101 determines that the operation of instructing the download of the program is performed. When key 805 is operated, CPU 101 determines from the operation that the user does not wish to download the program.

Referring to FIG. 13 again, the download confirmation screen is displayed in step S210, and then CPU 101 advances the process to step S220.

In step S220, CPU 101 determines whether the user performed the operation to instruct download of the program for at least one function in the specific functions or not. When it is determined that the above operation was performed, the process proceeds to step S230. When it is determined that the operation was performed not to download the program for the specific function, the process proceeds to step S70.

In step S230, CPU 101 transmits the information requesting the download as well as information specifying the program to be downloaded to server 200C. The latter information is produced based on the function selected on download confirmation screen 800.

Figure 18:
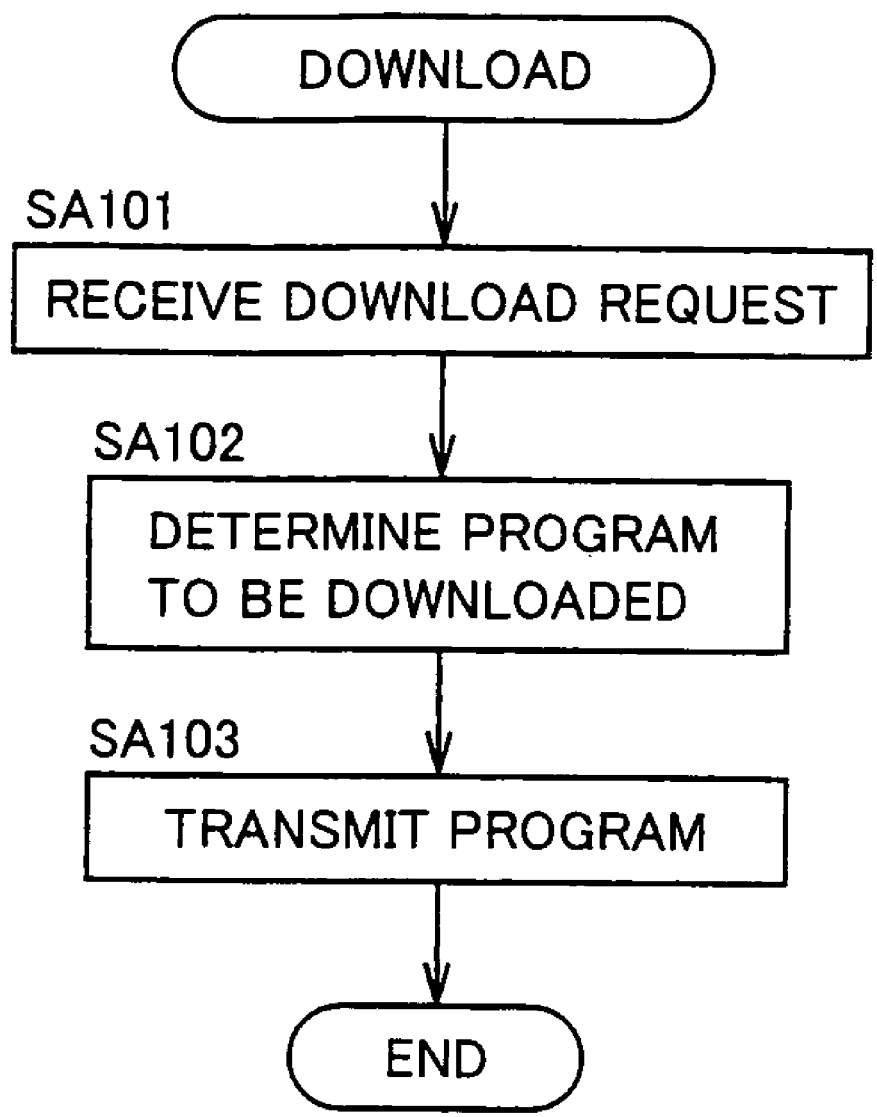
FIG. 18 is a flowchart of processing (download execution processing) executed by a CPU of the server in FIG. 3.

Based on the transmission of such information, CPU 601 of server 200C executes processing (download execution processing), of which flowchart is illustrated in FIG. 18.

Referring to FIG. 18, when CPU 101 transmits information requesting the download, CPU 601 receives the information requesting the download in step SA101.

In next step SA102, CPU 601 determines the program to be downloaded to MFP 100A based on the information, which is transmitted together with the download request information, for specifying the program to be downloaded.

In step SA103, CPU 601 transmits the program determined in step SA102 to MFP 100A.

As illustrated in FIG. 14, CPU 101 performs the processing in step S240 by receiving the program transmitted by the processing of server 100c in step SA103, and advances the process to step S250.

Figure 19:
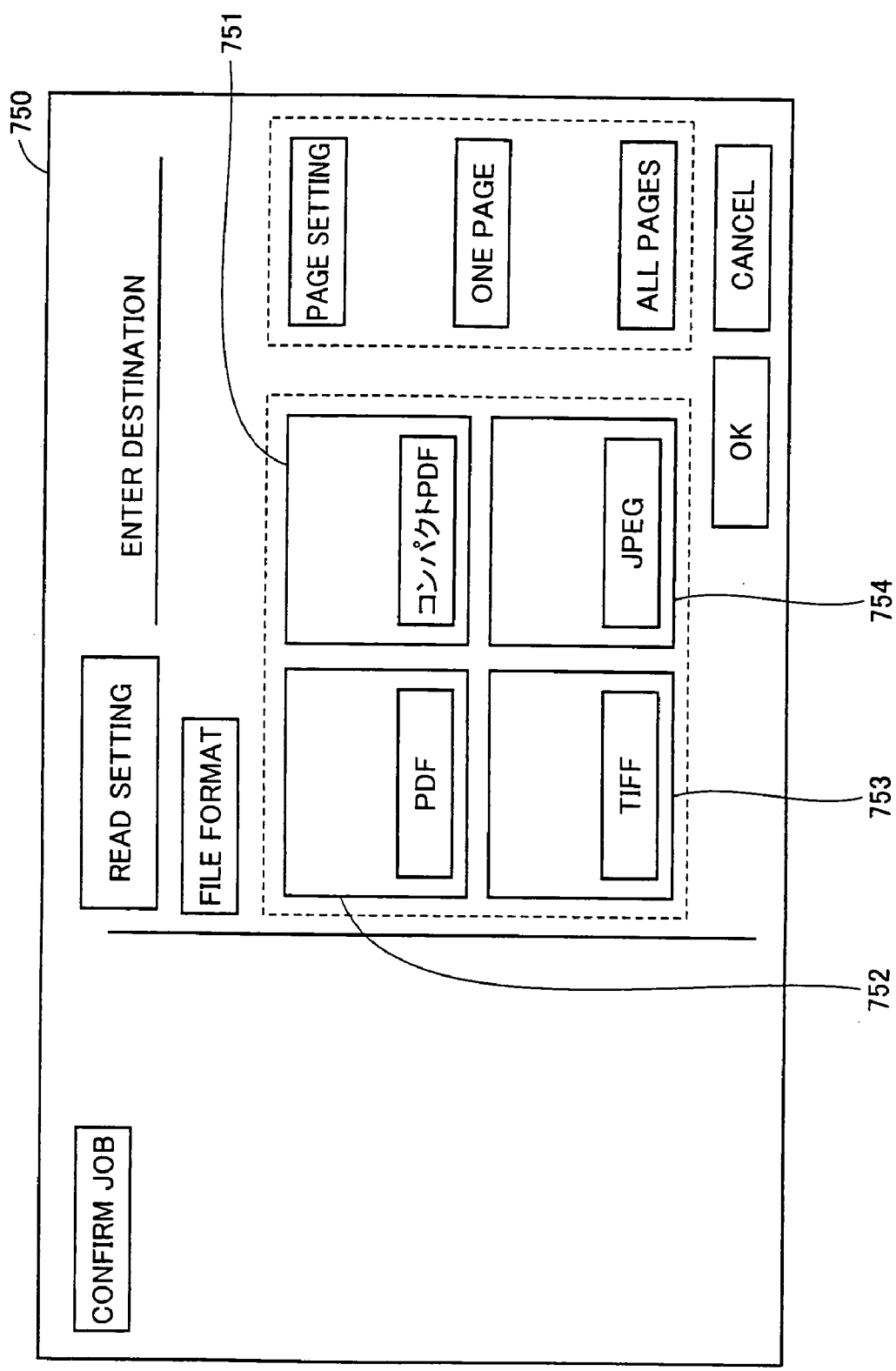
FIG. 19 shows an example of a customized screen displayed on the display screen in FIG. 2.

In step S250, CPU 101 displays a screen representing contents including the program received in step S240, and particularly displays on display screen 131 a customized screen prepared by changing the basic screen in FIG. 16 according to the log-in user. Then, the process proceeds to step S260. FIG. 19 illustrates an example of the customized screen.

A customized screen 750 is a setting screen related to the function of "read mode" of the scanning operation of scanner 120. More specifically, customized screen 750 represents select keys 751-754 for selecting the compact PDF, PDF, TIFF and JPEG as the read mode. By operating one of select keys 751-754, CPU 101 launches one of four applications "compact PDF application", "PDF", "TIFF" and "JPEG" corresponding to the "read mode selection" function already described with reference to FIG. 10. Thus, the customized screen is a setting screen related to the read mode select functions illustrated in FIG. 10.

Referring to FIG. 14 again, after the customized screen is displayed in step S250, CPU 101 determines in step S260 whether the user operated input keys 132 or not, and advances the process to step S270 when input keys 132 was operated.

In step S270, CPU 101 determines whether the operation, which is effected on input key 132 and is detected in step S260, is the operation for log-off or not. When it is the operation for log-off, the process proceeds to step S290. Otherwise, the processing is executed according to details of the operation in step S280, and then the process returns to step S250. In step S280, CPU 101 executes the processing corresponding to the details of the operation, and also stores information about details of the operation, which is executed in connection with the processing in step S280, in a predetermined memory or the like of CPU 101 in question. The above operation is the same as that in the item of "function 2" in the used function information (see FIG. 8). The number of times that each operation is executed will be added and stored until the log-off of the user in step S310 which will be described later.

Figure 20:
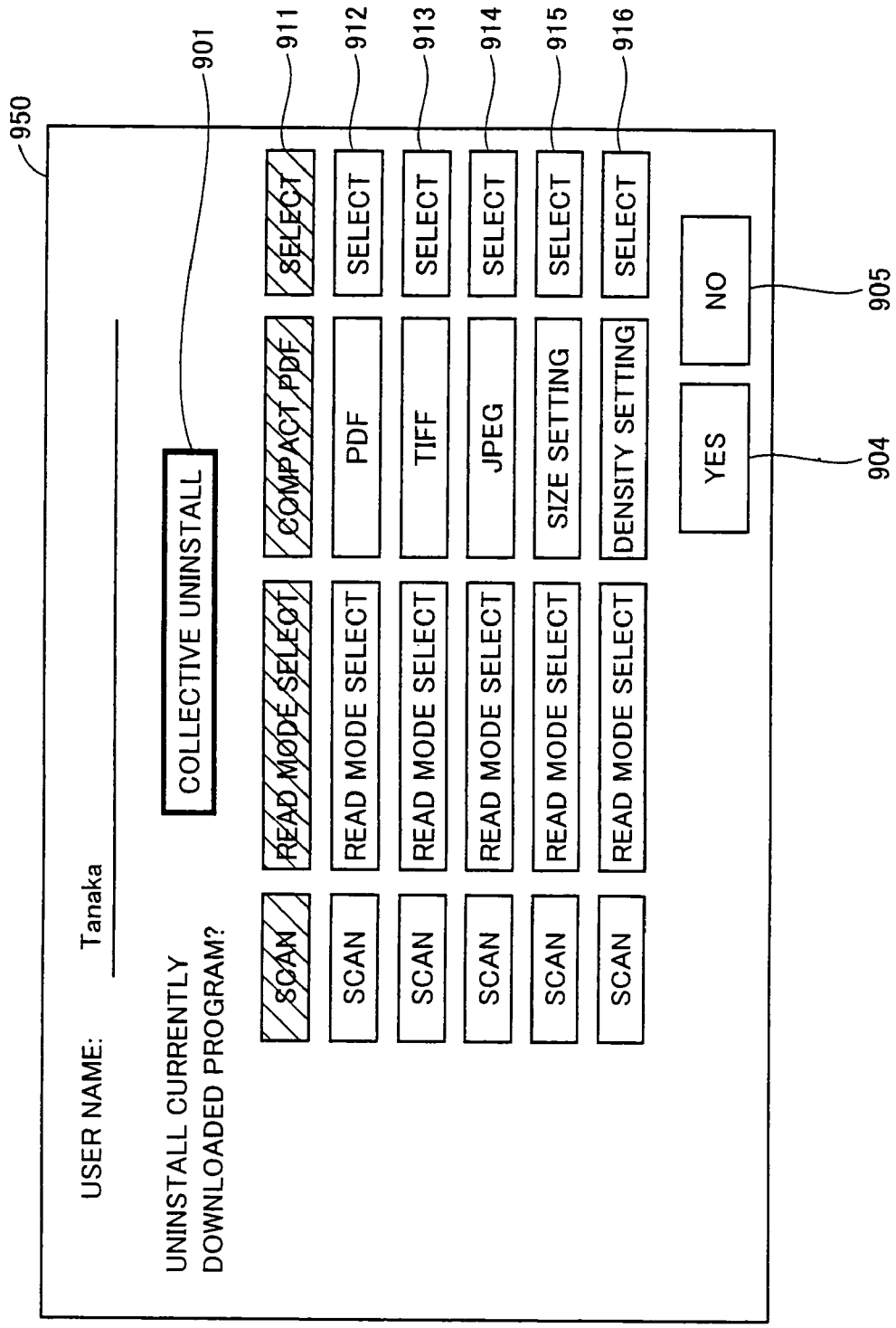
FIG. 20 illustrates an example of an uninstall inquiry screen displayed on the display screen in FIG. 2.

In step S290, CPU 101 displays on display screen 131 an uninstall inquiry screen for inquiring the user whether the program received for the current log-in user in step S240 is to be uninstalled or not. FIG. 20 shows an example of the uninstall inquiry screen also referred to as a "log-off screen".

Referring to FIG. 20, uninstall inquiry screen 950 represents the user name as well as the programs (applications) downloaded in step S240 and the names of functions corresponding to the program. Uninstall inquiry screen 950 represents a collective uninstall key 901 for instructing the uninstall of programs corresponding to such functions as well as select keys 911-916 for individually instructing uninstalling of the corresponding program.

FIG. 20 shows a state in which select key 911 as well as the application and the name of function corresponding to select key 911 are displayed in a color different from the others so that the program corresponding to select key 911 (i.e., program corresponding to the function "basic") is selected for uninstalling.

Uninstall inquiry screen 950 represents keys 904 and 905. When key 904 is operated in such a state that collective uninstall key 901 or at least one of select keys 911-916 is operated, i.e., in such a state that the download of at least one program is selected, CPU 101 determines that the operation of instructing the uninstalling of the program is performed. When key 905 is operated, CPU 101 determines from the operation that the user does not wish to uninstall the program.

Referring to FIG. 14 again, CPU 101 determines in step S300 whether the operation of instructing the uninstalling of program was performed or not, and advances the process to step S310 when it was performed. Otherwise, the process proceeds to step S320.

In step S310, CPU 101 uninstalls the program which is selected for uninstalling on uninstall inquiry screen 950, and then advances the process to step S320.

In step S320, CPU 101 performs the processing for log-off of the log-in user, and advances the process to step S330.

In step S330, CPU 101 updates the used function information in user information storing unit 154 by adding the number of times that the operation was executed after log-on in step S40 and before log-off in step S320. Also, CPU 101 updates the log-in time information in user information storing unit 154 by adding one to the number of log-in times for the user name of the user who logged off in step S320, and advances the process to step S340.

In step S340, CPU 101 transmits the used function information and log-in time information thus updated to server 200C. Server 200C updates these items of information related to MFP 100A, and then the process returns to step S10.

According to the embodiment described above, the image processing system having the plurality of MFPs is configured as follows. When the user frequently using a certain MFP (MFP 100B) in the system logs in a different MFP (MFP 100A) in the system, the different MFP downloads the program for implementing the function which is frequently used by the same user.

Since the program is downloaded as described above, the embodiment corrects the screen contents, which are displayed on display screen 131 at the time of log-in, according to the user as already described with reference to FIG. 19.

In customized screen 900 of the embodiment already described, the displayed contents are changed in the basic setting display field. However, the program to be downloaded according to the invention is not restricted to that related to the basic setting display field.

Figure 21:
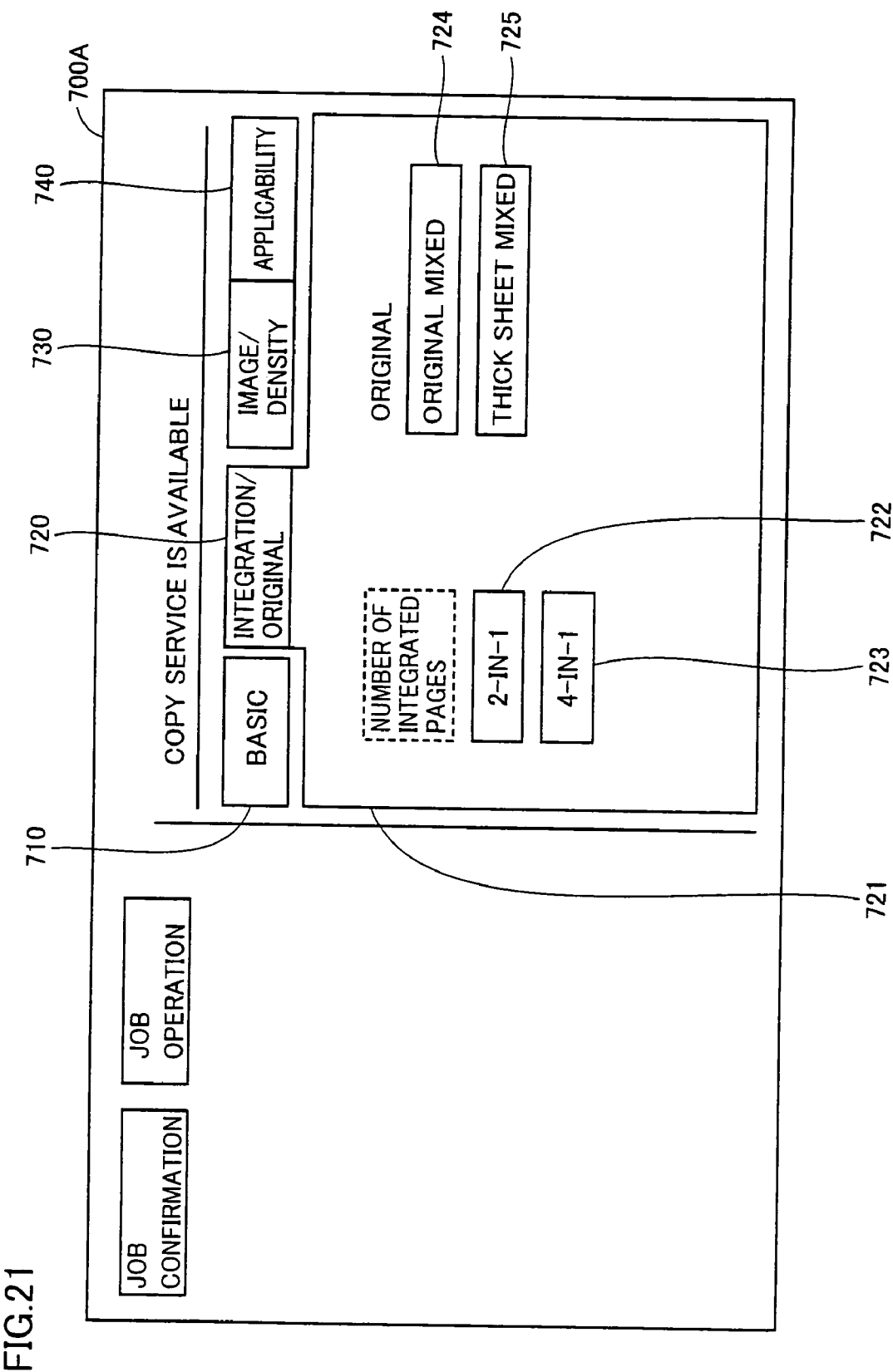
FIGS. 21, 22, 23 and 24 show by way of example images displayed on the display screen in FIG. 2.
Figure 22:
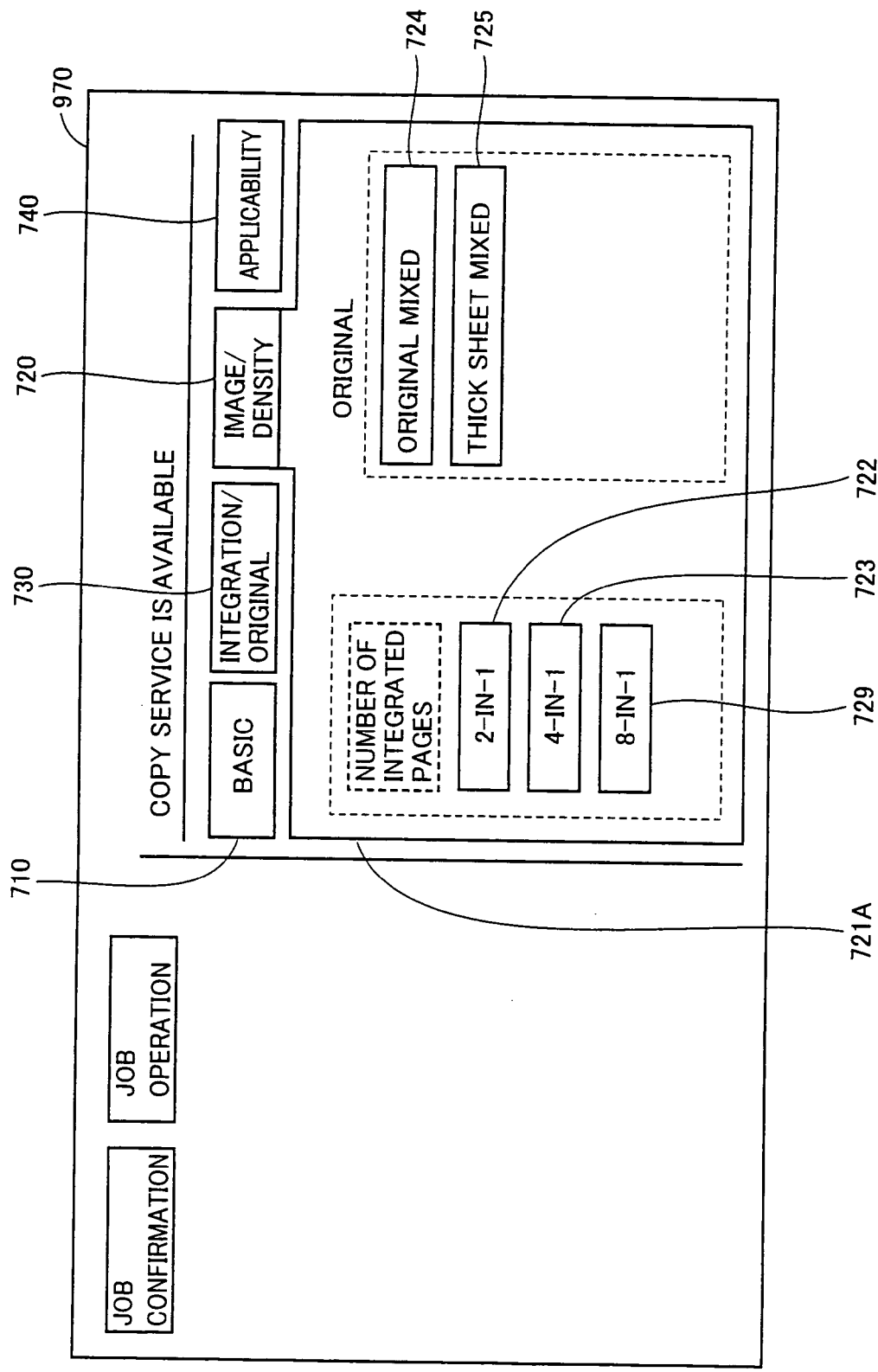

Referring to FIGS. 21 and 22, description will now be given on the case wherein the program relating to the "integration/original" menu, i.e., the menu for integrating and printing images of a plurality of original documents on a single sheet is downloaded as the program for the function frequently used in the different MFP by the log-in user.

FIG. 21 shows a screen displayed on display screen 131 when key 720 is operated on basic screen 700 which is currently displayed. Referring to FIG. 21, a screen 700A represents an integration/original setting display field 721 representing the details of setting of the "image/density" menu. Screen 700A represents a key 710 for setting the basic capabilities of the copying operation, instead of basic setting display field 710A on basic screen 700.

Integration/original setting display field 721 on screen 700A represents a 2-in-1 key 722 corresponding to the function of printing two original document images on one sheet, and a 4-in-1 key 723 corresponding to the function of printing four original documents images on one sheet. Integration/original setting display field 721 also represents keys 724 and 725 corresponding to the original.

FIG. 22 shows a screen 970 prepared by representing key 720 on the screen such as customized screen 900 which is displayed after downloading the program based on the function frequently used by the log-in user. FIG. 22 shows the screen displayed when the program for the function (8-in-1 function) of printing eight original document images on one sheet is downloaded as the program for the function frequently used by the log-in user.

Referring to FIG. 22, screen 970 represents an integration/original setting display field 721A. Integration/original setting display field 721A differs from integration/original setting display field 721 in FIG. 21 in that an 8-in-1 key 729 corresponding to the 8-in-1 function is additionally represented. Thus, MFP 100A downloads the program related to the function corresponding to the log-in user, and further can change the displayed contents on display screen 131 to correspond to the downloaded program.

The embodiment has been described in connection with the download of the program for the copy operation as well as the change in displayed contents on display screen 131 corresponding to it. However, the image processing device according to the invention executes the processing such as download of the program for the operations (scan, print and facsimile operations) other than the copy operation.

Figure 23:
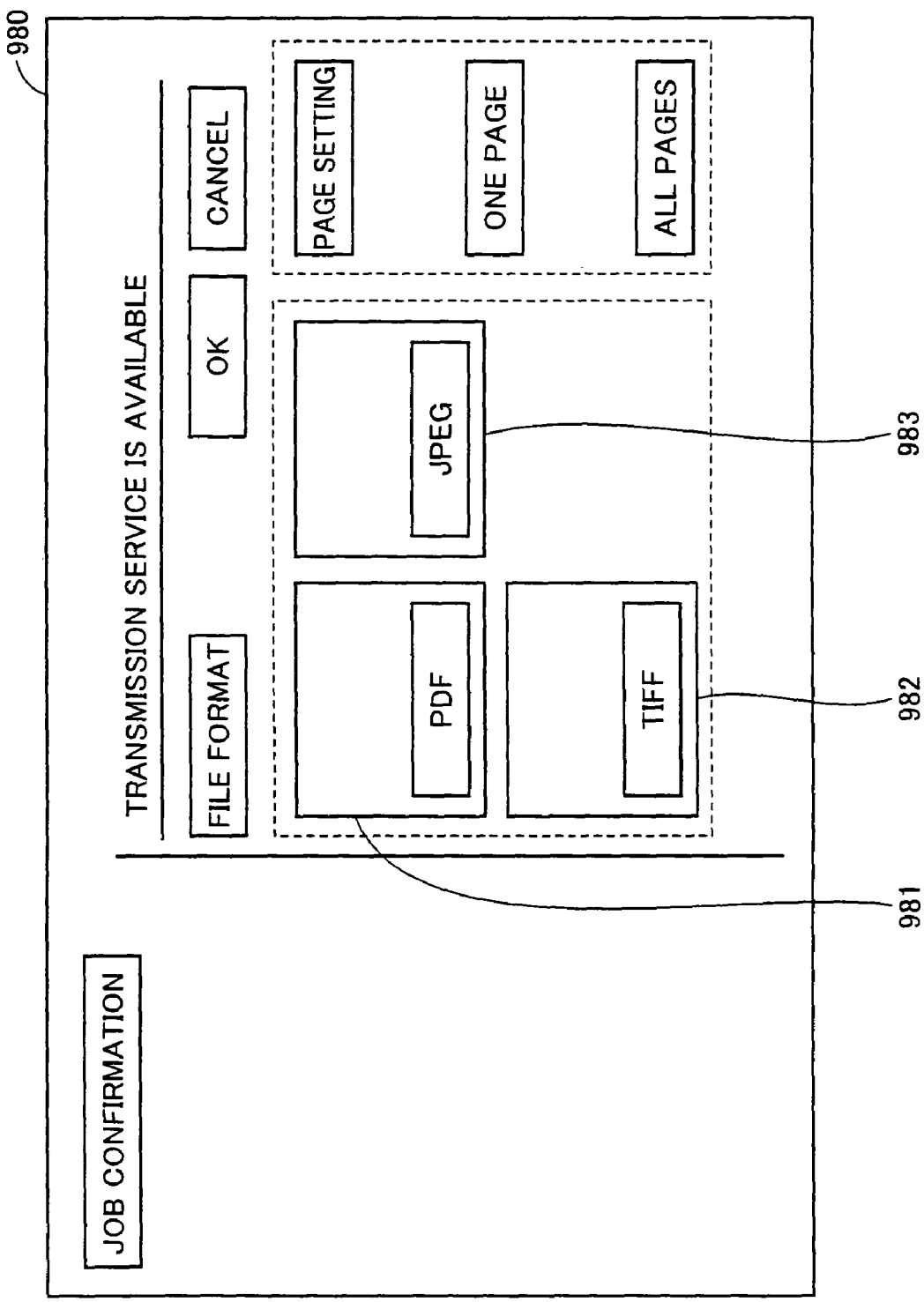
Figure 24:
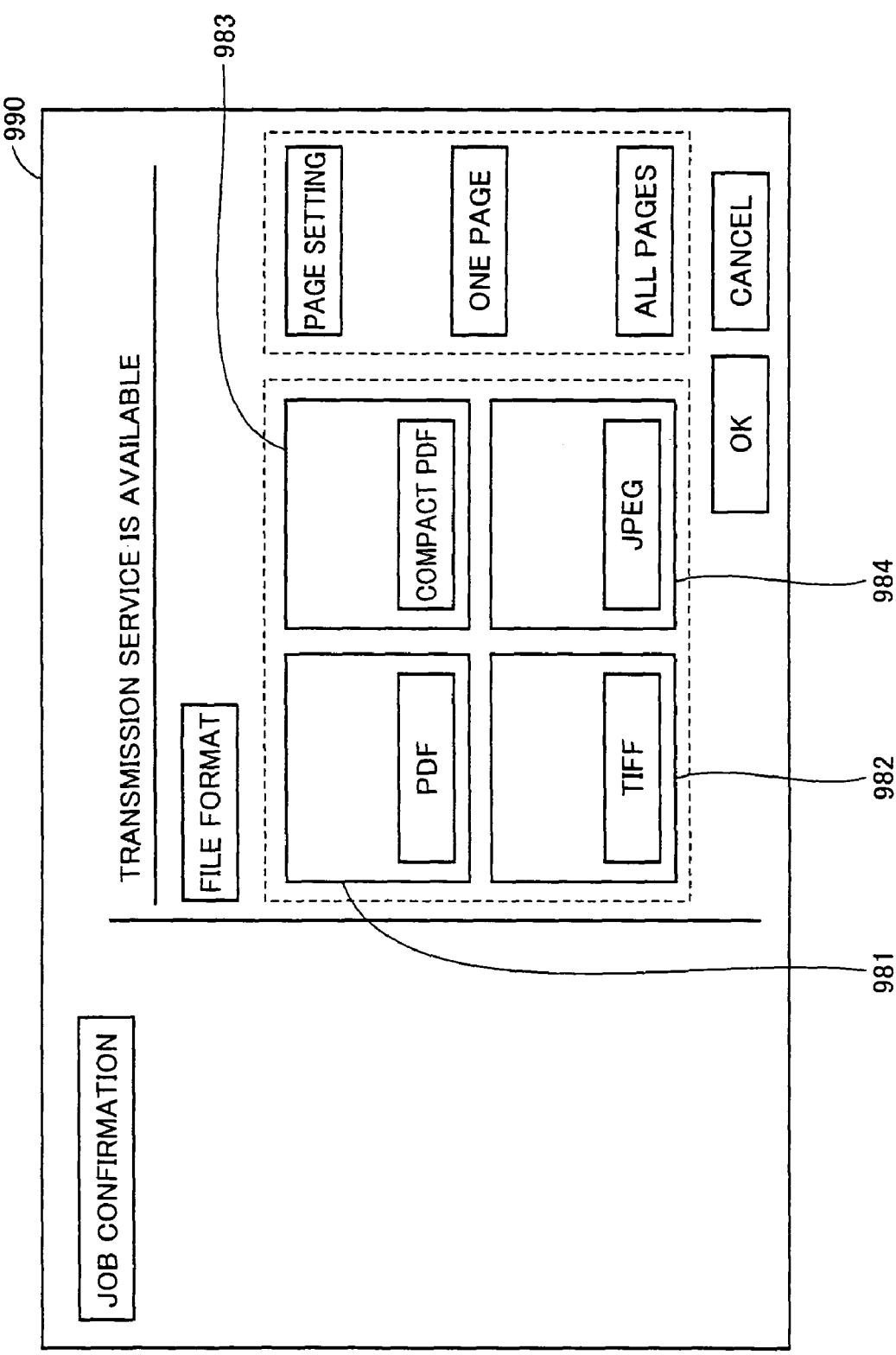

Referring to FIGS. 23 and 24, description will now be given on the change which is caused in displayed contents on display screen 131 when the program for the scan operation is downloaded.

FIG. 23 shows an example of the screen displayed on display screen 131 when MFP 100A performs the scan operation without downloading the program after the user logged in. FIG. 24 shows an example of the screen displayed on display screen 131 when MFP 100A performs the scan operation after the program corresponding to the log-in user is downloaded subsequently to the log-in of the user. It is assumed that the above downloaded program is a program for converting the image read by the scanner to image data in the compact PDF format.

Referring to FIG. 23, a screen 980 is provided for selecting the file format in which the image read by scanner 120 is stored, and represents keys 981, 982 and 983 for selecting the file formats of PDF, TIFF (Tagged Image File Format) and JPEG (Joint Photographic Experts Group), respectively.

Referring to FIG. 24, a screen 990 represents the same keys 981-983 as screen 980, and additionally represents a key 984 for selecting the function implemented by the downloaded program, i.e., for selecting the compact PDF as the data format for storing the image read by scanner 120.

In this embodiment, when MFP 100A has already stored the program for implementing the specific function for the log-in user (i.e., when YES in step S190), the customized screen is displayed so that the user can easily use this function without downloading the program.

In this embodiment, the image processing system includes two MFPs. However, the system may include more than two MFPs.

In the image processing system of the embodiment already described, the used function information is defined for each user, and the number of times that each user used each function in each MFP is counted in the used function information. The specific MFP is determined for the log-in user, and the used function information of the log-in user of the determined specific MFP is referred to. Thereby, the MFP logged in by the log-in user determines the program for inquiring of the user about the download of the program thus determined. In the image processing system according to the invention, it is merely required to count the times of use of each function in each MFP. Thus, the used function information in each MFP may be produced by obtaining the total number of times of use of each function in each MFP by all the users. In this case, the specific function is the function which was used a predetermined number of times or more according to the used function information in each MFP. In the case where the used function information is produced in this manner, when the specific MFP is determined for the log-in user, the specific function is determined by referring to the used function information in this specific MFP.

According to the embodiment already described, CPU 101 of MFP 100A executes the processing based on the data such as a program stored in ROM 105 or storing unit 107. However, the image processing device according to the invention is not restricted to this structure. CPU 101 may read via data reading unit 109 the data such as a program recorded the record medium removably attached to MFP 100A, and may execute the processing based on the data thus read.

[Second Embodiment]

An image processing system according to a second embodiment of the invention basically has the same structure as the first embodiment. Thus, the image processing system of the second embodiment may have the structure shown in FIG. 1.

The image processing system of the second embodiment is different from that of the first embodiment in processing executed by CPU 101 of MFP 100A already described with reference to FIGS. 12-14.

Figure 25:
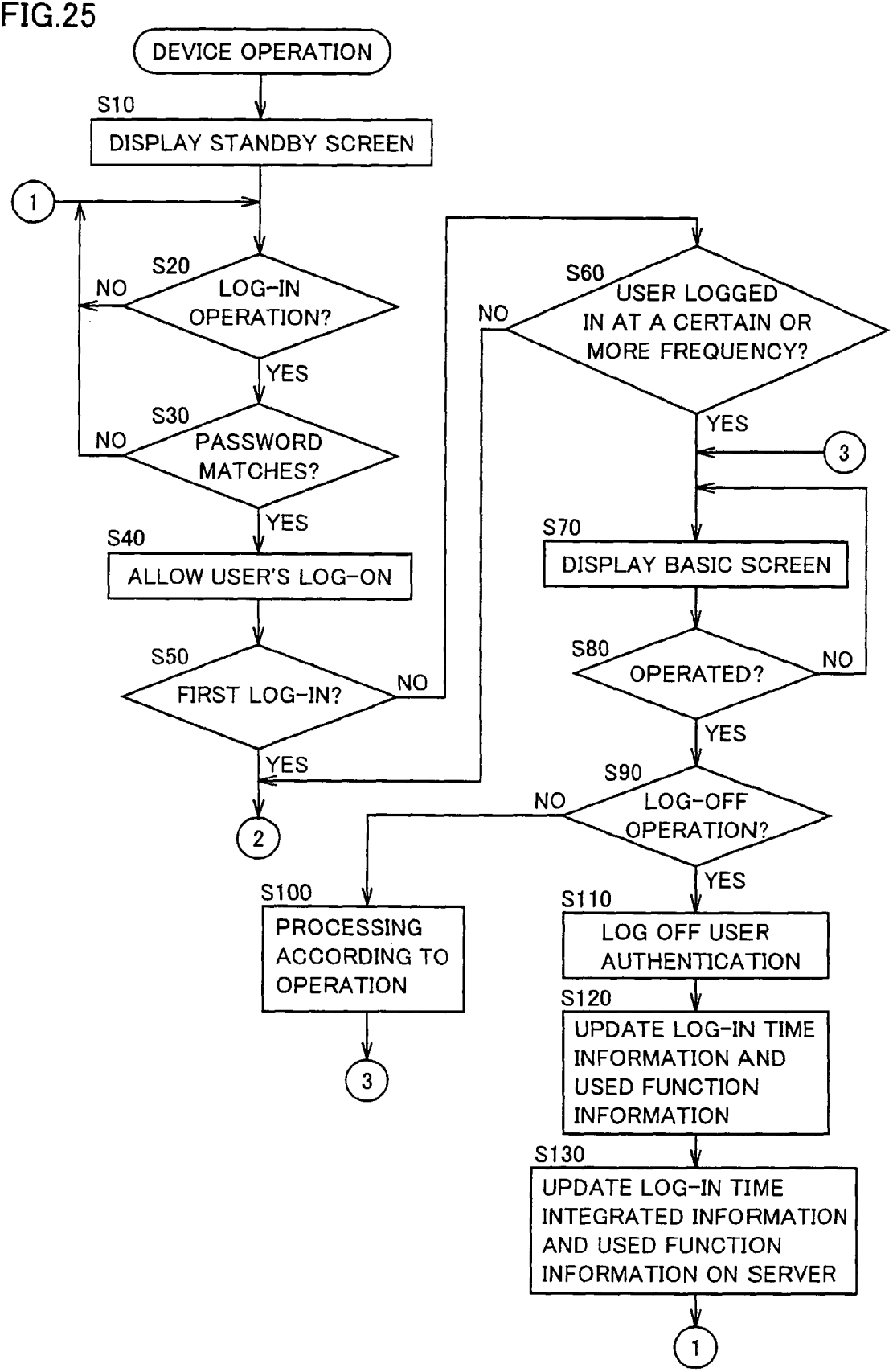
FIGS. 25, 26 and 27 are flowcharts of device execution processing executed when a CPU operates in response to a user's operation on input keys in an MFP forming an image processing system of a second embodiment of the invention.
Figure 26:
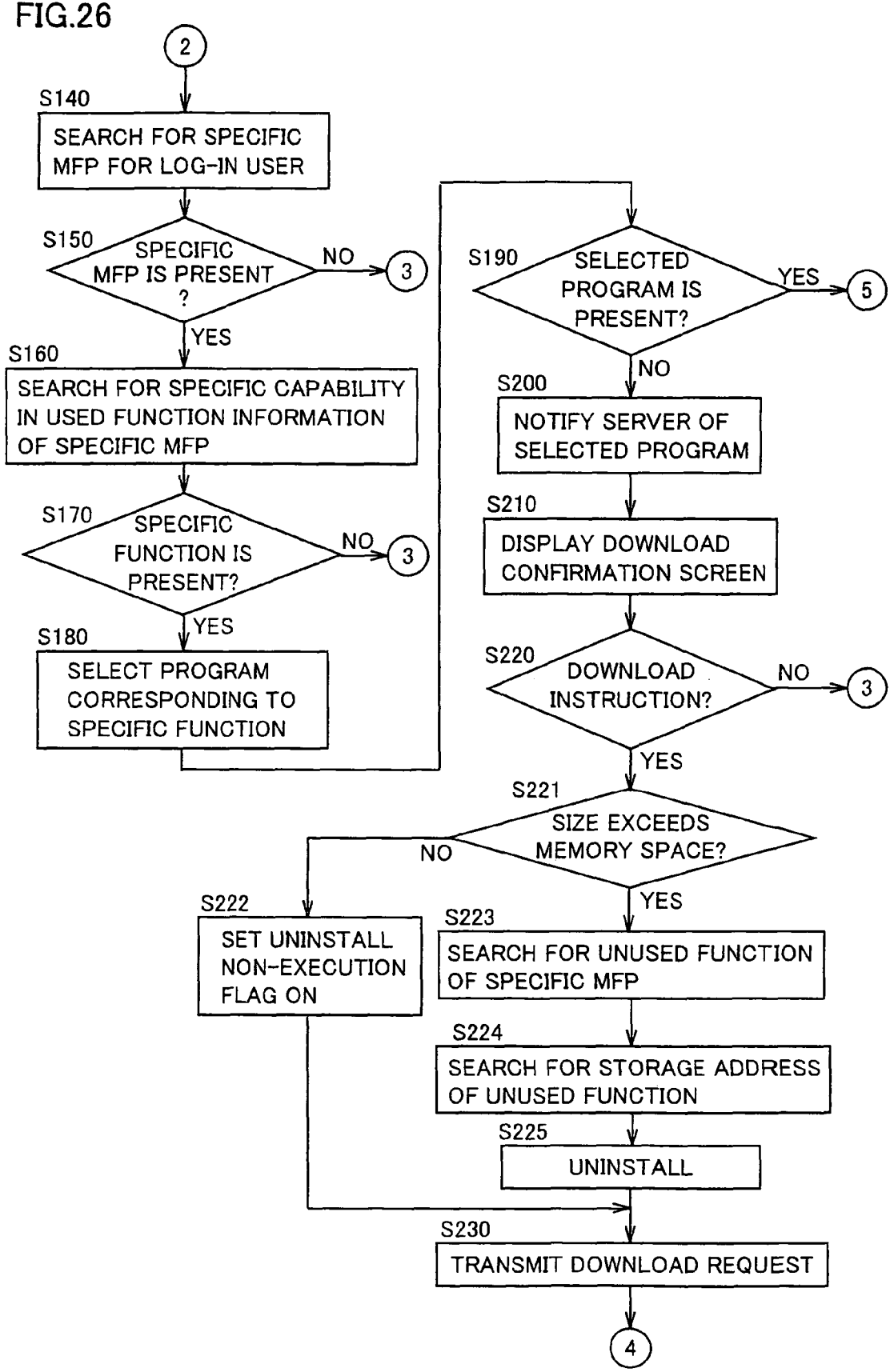
Figure 27:
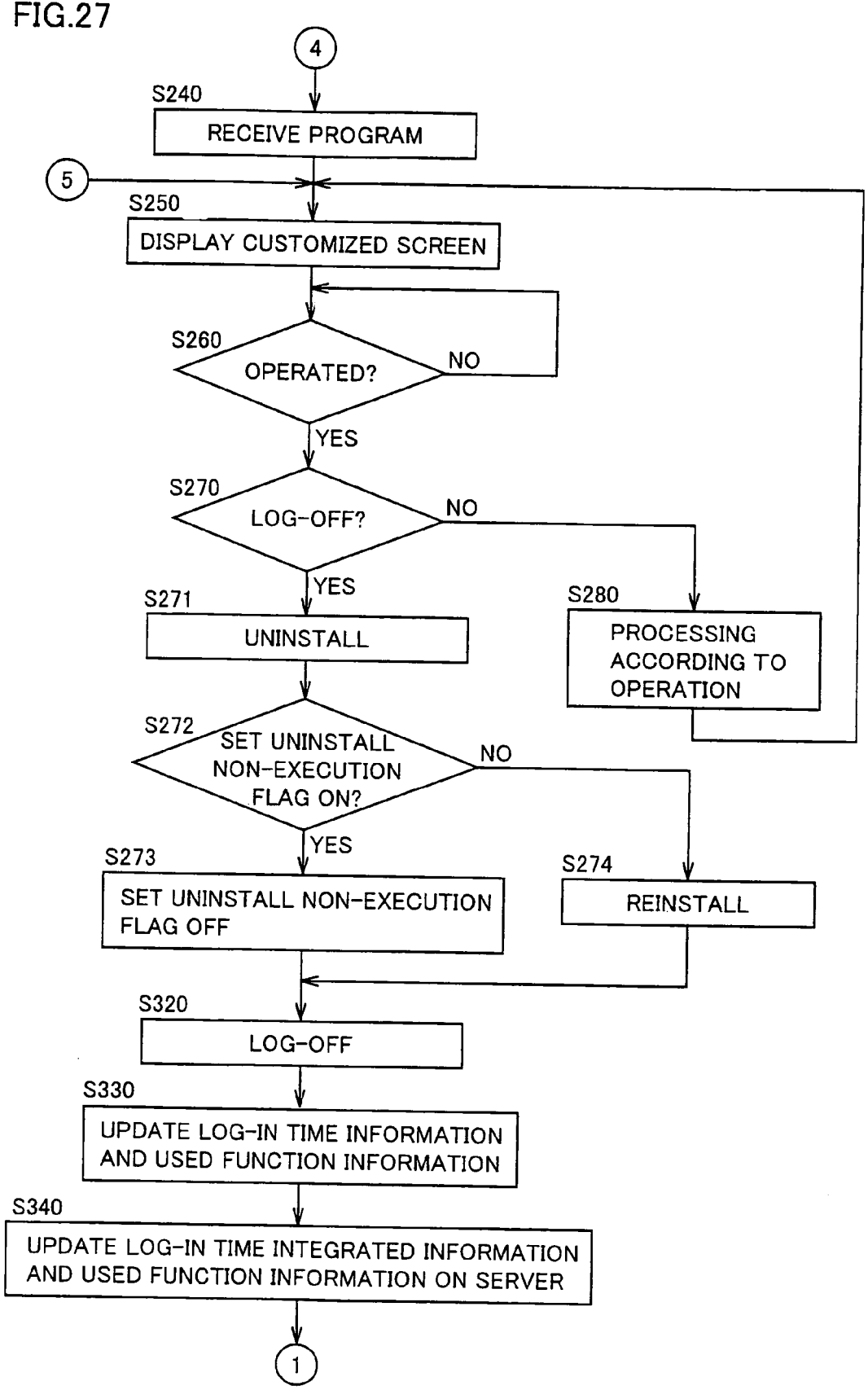

Referring to FIGS. 25-27, description will now be given primarily on the difference in processing executed by MFP 100A between the second and first embodiments. FIGS. 25-27 are flowcharts of the processing executed by the device when CPU 101 of MFP 100A of the second embodiment operates in response to the user's operation on input keys 132 of MFP 100A.

After executing the processing from step S10 to step S200 (see FIGS. 20 and 25), CPU 101 displays the download confirmation screen (see FIG. 17) in step S210, and determines in step S220 whether the user performed the operation to instruct download of a program for at least one function among the specific functions or not. When it is determined that the above operation was performed, the process proceeds to step S221. When it is determined that the operation was performed to indicate that the user does not intend to download the program for the specific function, the process proceeds to step S70 similarly to the first embodiment.

When the user selects the function via download confirmation screen 800, CPU 101 determines in step S221 whether the size of the program for implementing the selected function exceeds a memory function of program storing unit 156 (storing unit 107 or RAM 103) or not, i.e., whether an available space of storing unit 107 or RAM 103 is smaller than the size of the program which implements the function selected on download confirmation screen 800 by the user. When CPU 101 determines that the program size exceeds the available space of storing unit 107 and RAM 103, it advances the process to step S223. Otherwise, CPU 101 advances the process to step S222.

In step S223, CPU 101 refers to the number of times of use of each function in the used function information of the foregoing specific MFP, and thereby searches for the unused function in the specific MFP. The unused function is the function which was used 0 times.

In step S224, CPU 101 searches for the storage address of the program, which implements the above unused function, in the MFP which is currently logged in by the user.

In step S225, CPU 101 downloads the program of the unused function, i.e., the program stored in the storage address determined in step S224 into the specific MFP, and thereafter uninstalls it from its own device. Then, the process proceeds to step S230.

In step S222, CPU 101 sets (turns on) an uninstall non-execution flag in RAM 103 or the like, and then advances the process to step S230. Then, CPU 101 of this embodiment performs operations from step S230 to step S280 (or step S270) in FIGS. 26 and 27 substantially in the same manner as those in the first embodiment.

As illustrated in FIG. 27, CPU 101 determines in step S270 whether the operation, which is effected on input keys 132 and is detected in step S260, is the operation for log-off or not. When it is the operation for log-off, the process proceeds to step S271.

In step S271, CPU 101 uninstalls the program received in step S240, and advances the process to step S272.

In step S272, CPU 101 determines whether the uninstall non-execution flag to be set in step S222 is already set or not. When it is set, CPU 101 advances the process to step S273. When CPU 101 determines that the uninstall non-execution flag is reset, it advances the process to step S274.

In step S274, CPU 101 executes the processing of reinstalling the program which was uninstalled in step S223, and advances the process to step S320. In step S274, CPU 101 specifically requests server 200C to download the program which was uninstalled in step S223. When server 200C receives from CPU 101 the information requesting the download of program, it executes the processing in steps SA101-SA103 in FIG. 18, and transmits the download-requested program to MFP 100A. In response to the reception of the program, CPU 101 installs the program.

In step S273, CPU 101 resets the uninstall non-execution flag, and advances the process to step S320.

CPU 101 of this embodiment executes the processing from step S320 to step S340 similarly to CPU 101 of the first embodiment.

According to the embodiment already described, when a certain user desires download of a program implementing a function which has been used in a different MFP of the system, and RAM 103 and storing unit 107 of MFP 100A do not have a sufficient available space, the program already stored in the MFP is uninstalled. The uninstalled program will be installed again in MFP 100A when the above certain user enters the information requesting the log-off via input keys 132.

[Third Embodiment]

Figure 28:
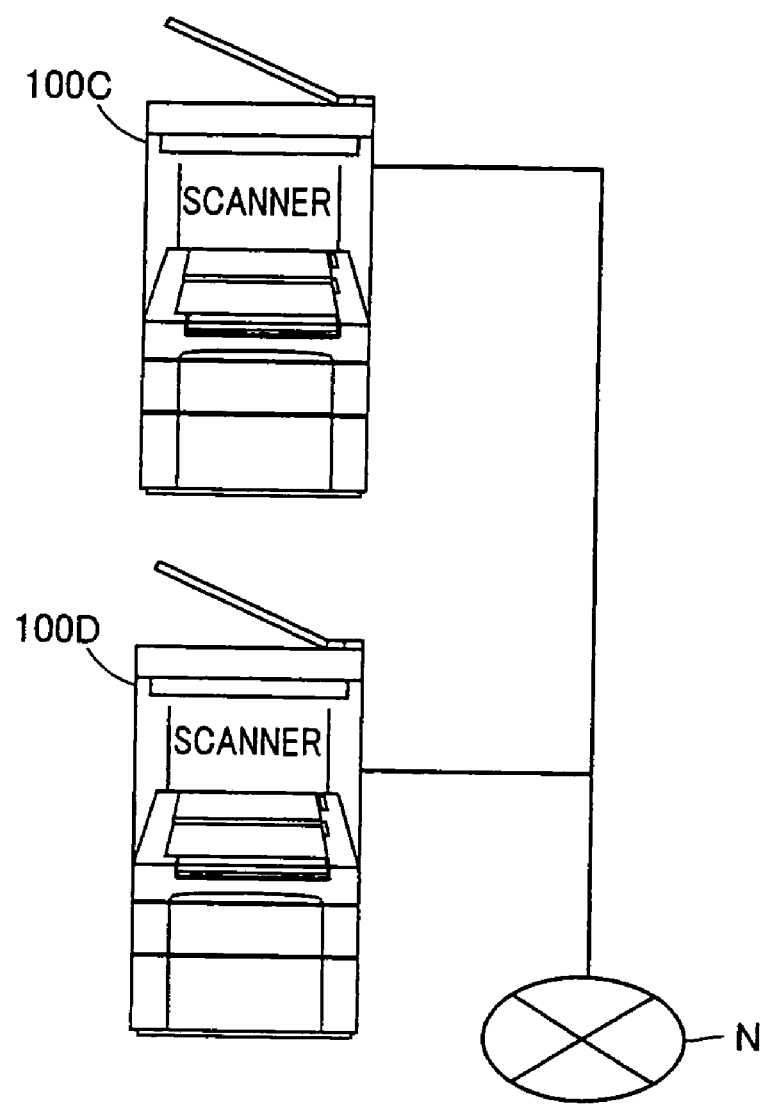
FIG. 28 shows a structure of an image processing system using an MFP which is a third embodiment of the invention.

FIG. 28 shows a structure of an image processing using MFPs according to a third embodiment of the invention.

Referring to FIG. 28, the image processing system of the embodiment includes MFPs 100C and 100D. MFPs 100C and 100D are connected to a network, which is connected to the Internet N. MFPs 100C and 100D can be connected to a line such as a PSTN for facsimile transmission. In this embodiment, two MFPs are connected to the network, but more than two MFPs can be connected thereto. The number may be changed according to an installation environment of the image processing system.

MFPs 100C and 100D have substantially the same hardware structures as MFP 100A shown in FIG. 2.

Figure 29:
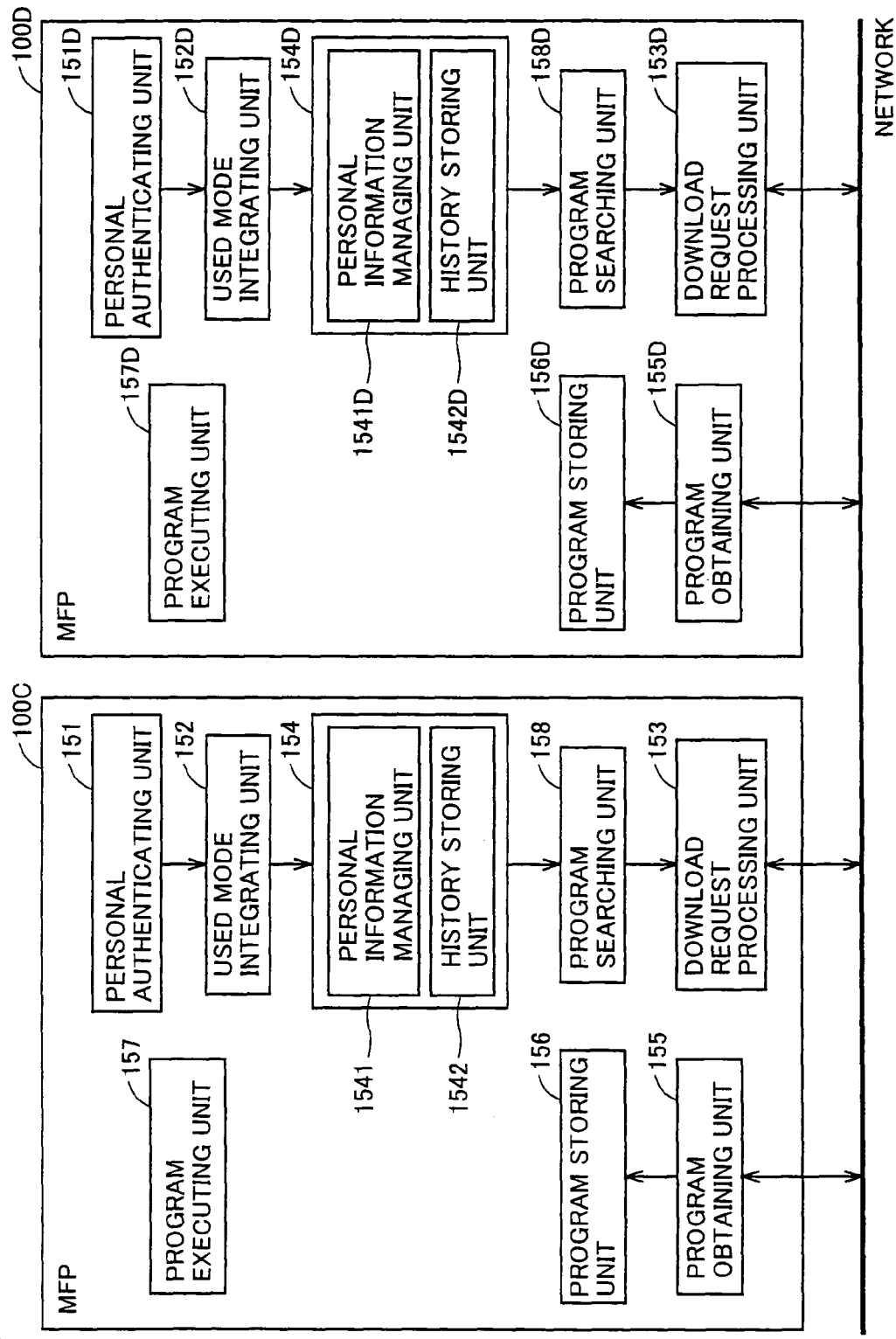
FIG. 29 is a block diagram illustrating two MFPs in the image processing system shown in FIG. 28.

FIG. 29 is a block diagram of the two MFPs (MFPs 100C and 100D) in the image processing system shown in FIG. 28.

Referring to FIG. 29, MFP 100C includes personal authenticating unit 151 performing personal authentication based on information entered by the user for log-in, used mode integrating unit 152 causing the predetermined counter to execute counting based on the mode ("function 2" in FIG. 8) used by the user, download request processing unit 153 executing processing related to a request for downloading the program required for the function which corresponds to the log-in user, user information storing unit 154 storing information related to the function used by the user, program obtaining unit 155 executing processing for downloading the program, program storing unit 156 storing various programs to be executed by MFP 100C and program executing unit 157 executing the program stored in program storing unit 156.

According to the embodiment, user information storing unit 154 includes a personal information managing unit 1541 and a history storing unit 1542. Personal information managing unit 1541 stores password managing information and log-in time information (see FIG. 7) for all the MFPs forming the image processing system. History storing unit 1542 stores the used function information (see FIG. 8) of each user related to each MFP forming the image processing system.

In this embodiment, program obtaining unit 155 performs the processing of downloading the program to its own device, and also executes the processing of transmitting the program stored in program storing unit 156 to a different MFP forming the same image processing system in response to a request from this different MFP.

In this embodiment, MFP 100C includes a program searching unit 158. Program searching unit 158 searches for information (program title or the like) specifying the program required for implementing each function ("function 2" see FIG. 8).

Similarly to MFP 100C, MFP 100D includes a personal authenticating unit 151D, a used mode integrating unit 152D, a download request processing unit 153D, a user information storing unit 154D, a program obtaining unit 155D, a program storing unit 156D, a program executing unit 157D and program searching unit 158.

MFPs 100C and 100D have substantially the same system structures as MFP 100A as already described with reference to FIG. 5.

Figure 30:
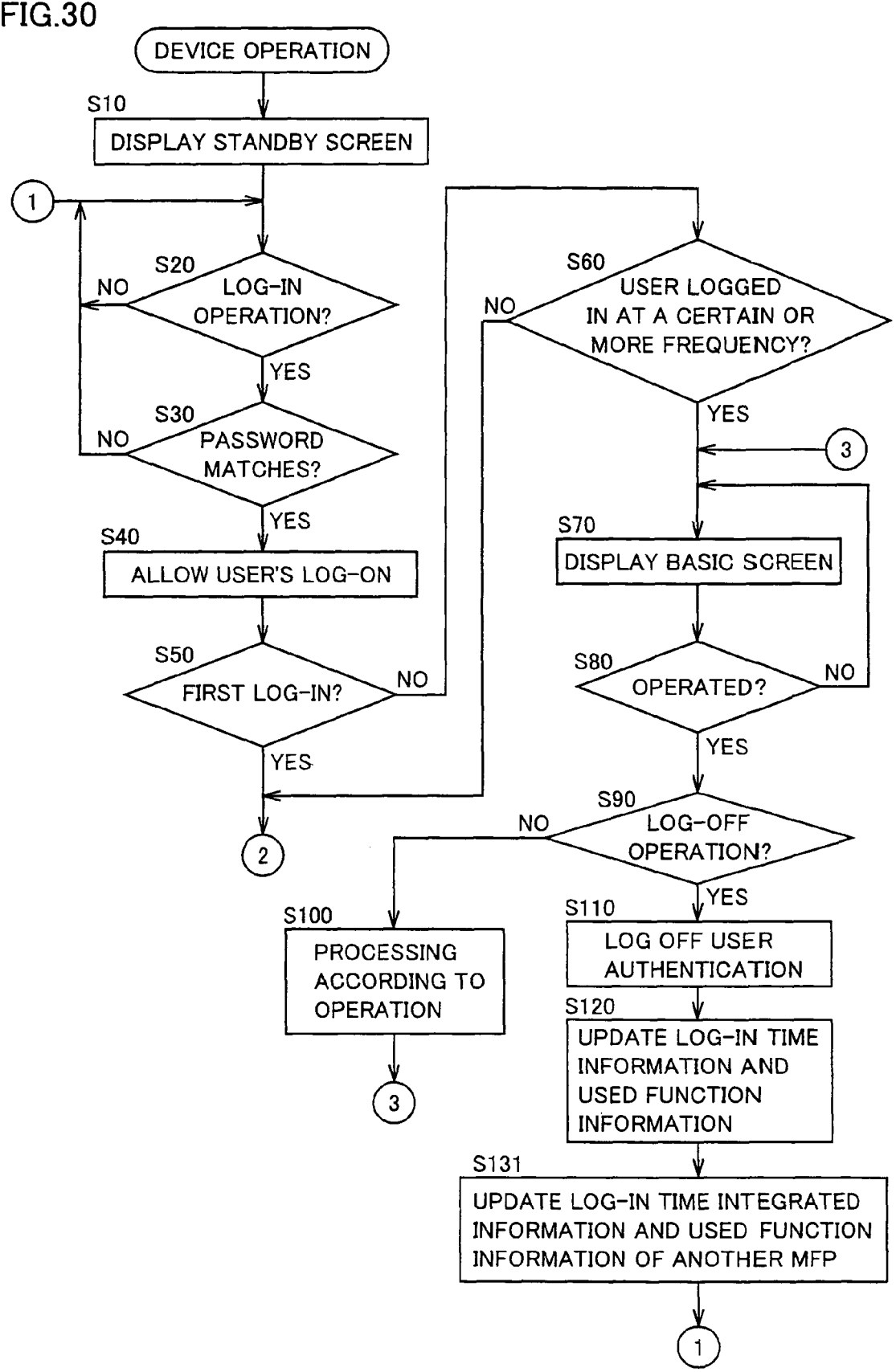
FIGS. 30, 31 and 32 are flowcharts of device execution processing executed when the CPU operates in response to a user's operation on input keys in the MFP of the image processing system shown in FIG. 28.
Figure 31:
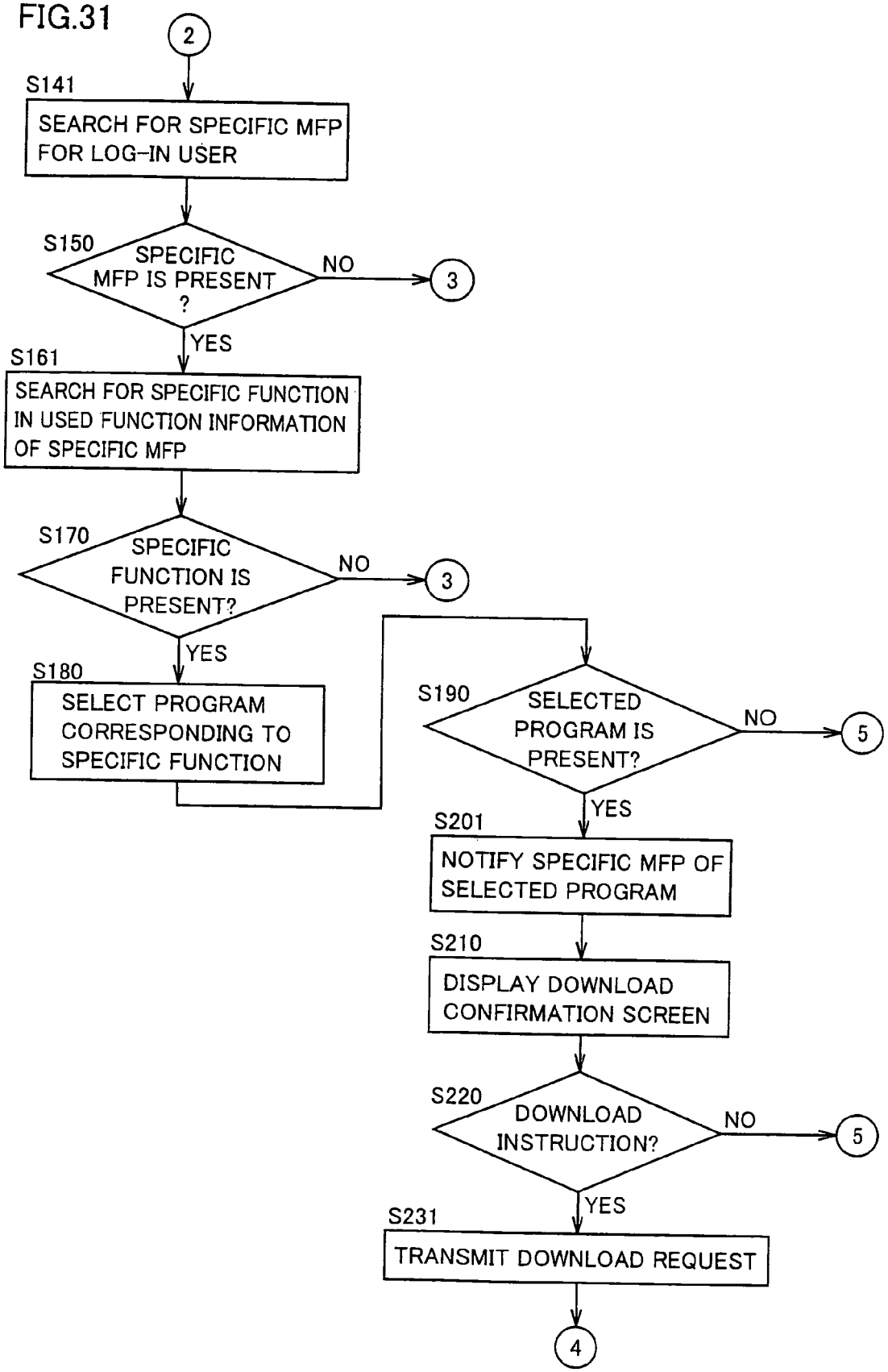
Figure 32:
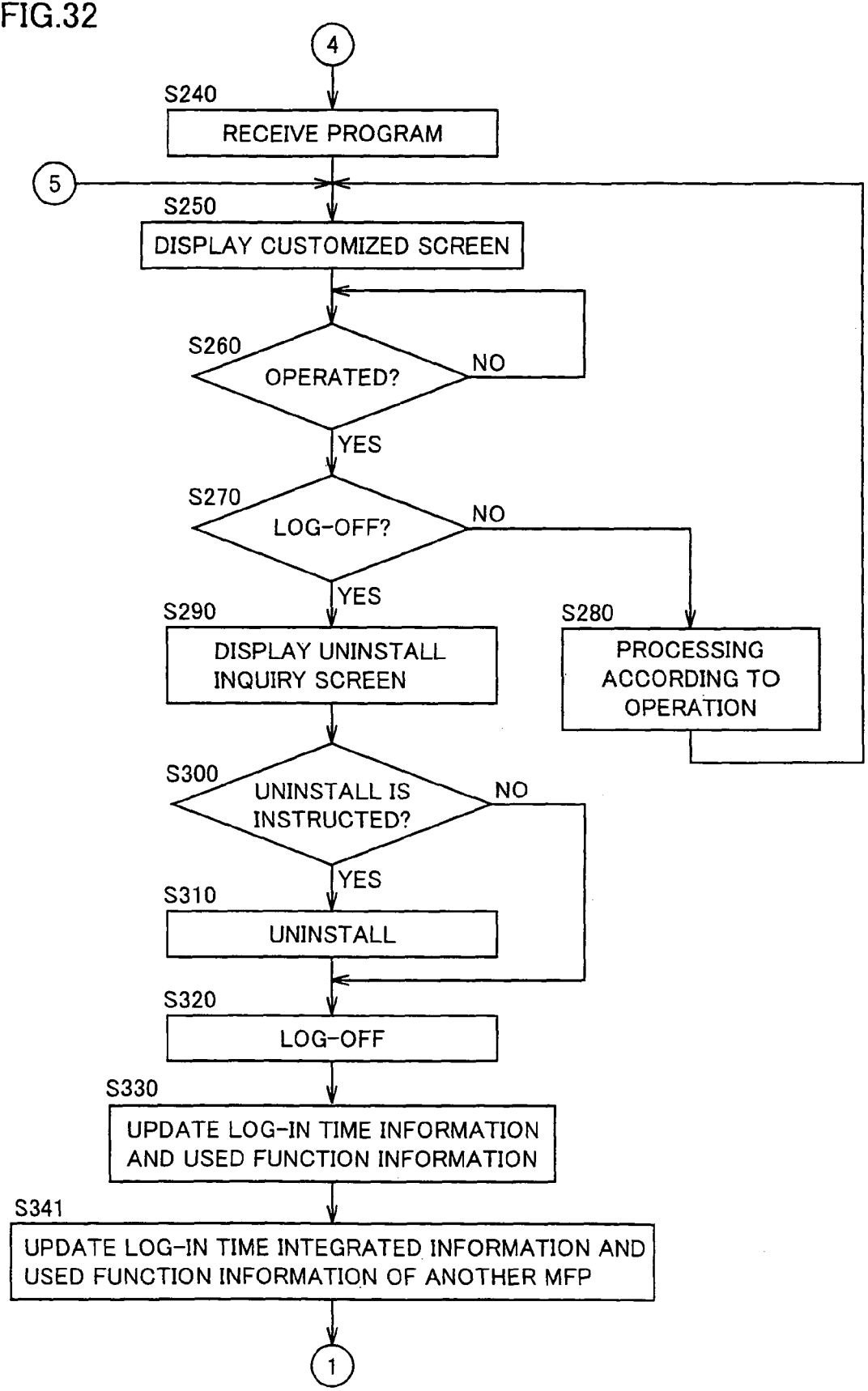

FIGS. 30-32 are flowcharts of the device execution processing which is executed when CPU 101 of MFP 100C operates in response to the user's operation on input keys 132 of MFP 100C.

Referring to FIG. 30, CPU 101 substantially performs in steps S10-S120 the same processing as that executed by CPU 101 of MFP 100A.

Thus, CPU 101 of MFP 100C displays a standby screen (see FIG. 15) on display screen 131 in step S10, and advances the process to step S30 when it determines that a user performed a log-in operation.

CPU 101 of MFP 100C checks a password in step S30, and advances the process to step S40 when it determines that the checked password matches with the user name in the password managing information.

In step S40, processing is performed for allowing the log-on of the user, and it is determined in step S50 whether the log-in user has logged in MFP 100C for the first time or not. When it is the first log-in, the process proceeds to step S141. Otherwise, the process proceeds to step S60.

In step S60, it is determined whether the log-in user logged in MFP 100C a predetermined number of times or more, or not. When the log-in was performed the predetermined number of times or more, the process proceeds to step S70. Otherwise, the process proceeds to step S141.

In step S70, the basic screen (see FIG. 16) is displayed on display screen 131. In step S80, it is determined whether the user operated input keys 132 or not. When operated, the process proceeds to step S90.

In step S90, it is determined whether the operation detected in step S80 is the operation for log-off or not. When it is for the log-off, the process proceeds to step S110. Otherwise, processing is performed according to the details of the operation in step S100, and then the process returns to step S70.

In step S110, the processing for log-off is performed for the log-in user, and the process proceeds to step S120.

In step S120, CPU 101 updates the used function information in user information storing unit 154 by adding the number of operations executed after the log-on in step S40 and before the log-off in step S110. Also, the log-in time information in user information storing unit 154 is updated by adding one to the log-in times for the user who logged off in step S110, and the process proceeds to step S131.

In step S131, CPU 101 of MFP 100C transmits the used function information and log-in time information updated in step S120 to all the other MFP(s) (MFP 100D in this embodiment) forming the image processing system. Thereby, the used function information and log-in time information for MFP 100C are updated in all the other MFP(s) in the image processing system. Thus, in the image processing system of this embodiment, each MFP has stored the used function information and log-in time information for all the MFPs. Thereafter, CPU 101 of MFP 100C returns the process to step S10.

Referring to FIG. 31, CPU 101 in MFP 100C searches the log-in time information, which was stored in personal information managing unit 1541, for all the MFPs forming the image processing system in step S141, and thereby searches for the specific MFP for the log-in user.

As a result of the searching in step S141, CPU 101 in MFP 100C determines in step S150 whether the specific MFP for the log-in user is present or not. When the specific MFP is present, the process proceeds to step S160. Otherwise, the process proceeds to step S70.

In step S161, CPU 101 in MFP 100C searches for the specific function in the used function information for the log-in user of the specific MFP in history storing unit 1542.

From the result of searching in step S161, CPU 101 of MFP 100C determines in step S170 whether the specific function is present or not. When the specific function is present, the process proceeds to step S180. Otherwise, the process proceeds to step S70.

In step S181, CPU 101 in MFP 100C causes program searching unit 158 to select the program corresponding to the specific function.

In step S190, CPU 101 of MFP 100C determines whether its own device (MFP 100C) has stored the program selected in step S180 or not. When stored, the process proceeds to step S250. Otherwise, the process proceeds to step S201.

In step S201, CPU 101 of MFP 100C notifies the specific MFP of the program selected in step S181.

In step S210, CPU 101 in MFP 100C displays the download confirmation screen (see FIG. 17) on display screen 131, and determines in step S220 whether an operation was performed for instructing download of a program for at least one function or not. When it is determined that the operation for such instruction was performed, the process proceeds to step S231. When it is determined according to the operation that the user does not wish the download of the program for the specific function, the process proceeds to step S70.

In step S231, CPU 101 of MFP 100C transmits the information requesting the download to the specific MFP together with the information specifying the program to be downloaded. For example, when specific MFP is MFP 100D, the above items of information are transmitted to MFP 100D in step S231.

Figure 33:
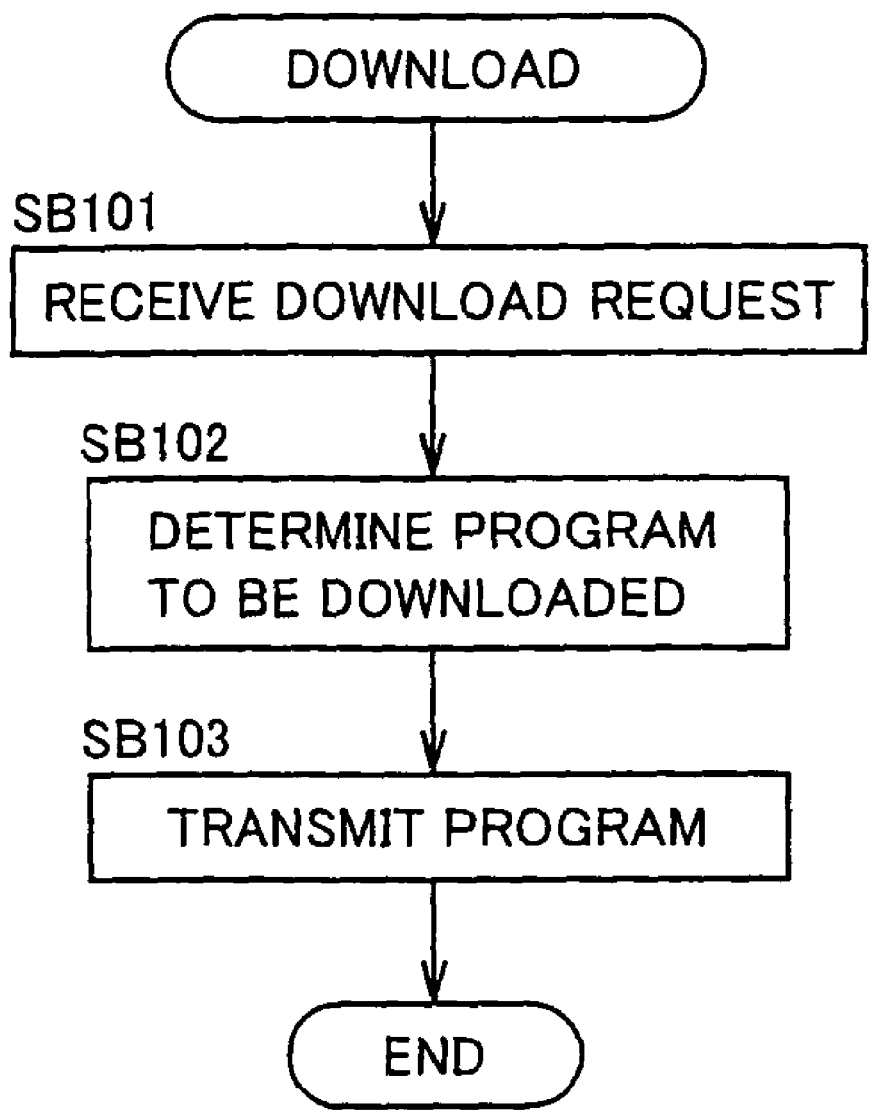
FIG. 33 is a flowchart of download execution processing executed in the image processing system shown in FIG. 28 by the CPU of the MFP on a receiver side of information in the processing of FIG. 31.

FIG. 33 is a flowchart of the processing (download execution processing) executed by the CPU (which will be referred to as the "CPU of the specific MFP" hereinafter) of the MFP on the receiver side of the information in response to the transmission of the above items of information.

Referring to FIG. 33, when CPU 101 of MFP 100C transmits the information requesting the download, the CPU of the specific MFP receives the information requesting the download in step SB101.

Then, the CPU of the specific MFP determines the program to be downloaded to MFP 100C based on the information which is received together with the download requesting information.

In step SB103, the CPU of the specific MFP transmits the program determined in step SB102 to MFP 100C.

As illustrated in FIG. 14, CPU 101 in MFP 100C receives in step S240 the program which is transmitted from the CPU of the specific MFP by the processing in step SB 103, and advances the process to step S250.

In step S250, CPU 101 of MFP 100C displays the screen (customized screen), which represents the details including the program received in step S240, on display screen 131, and advances the process to step S260.

In step S260, CPU 101 of MFP 100C determines whether the user operated input keys 132 or not, and advances the process to step S270 when operated.

In step S270, CPU 101 of MFP 100C determines whether the operation on input keys 132, which is detected in step S260, is the operation for log-off or not. When it is the operation for log-off, the process proceeds to step S290. Otherwise, the processing is executed according to details of the operation in step S280, and then the process returns to step S250.

In step S290, CPU 101 of MFP 100C displays the uninstall inquiry screen (see FIG. 20) on display screen 131, and advances the process to step S300.

In step S300, CPU 101 of MFP 100C determines whether the operation of instructing the uninstalling of the program was performed or not. When it is determined that the operation was performed, the process proceeds to step S310. Otherwise, the process proceeds to step S320.

In step S310, CPU 101 of MFP 100C uninstalls the program which is selected for uninstalling on uninstall inquiry screen 950, and the process proceeds to step S320.

In step S320, CPU 101 performs the processing for log-off of the log-in user, and advances the process to step S330.

In step S330, CPU 101 updates the used function information of user information storing unit 154 by summing up the times of the operation executed after the log-on in step S40 and before the log-off in step S320, and also updates the log-in time information of user information storing unit 154 by adding one to the log-in times for the user name who logged off in step S320. Then, the process proceeds to step S341.

In step S341, CPU 101 of MFP 100C transmits the used function information and log-in time information updated in step S120 to all the other MFP(s) forming the image processing system, similarly to step S131.

According to the embodiment already described, each MFP stores the information which is stored in server 200C according to the first embodiment (i.e., the log-in time information and used function information for all the MFPs forming the image processing system). Therefore, when a user frequently using a certain MFP (MFP 100D) in the system logs in a different MFP (MFP 100C) in the system, the different MFP can download the program implementing the function which is frequently used in the certain MFP by the user, even if the image processing system does not have a server.

[Fourth Embodiment]

An image processing system according to a fourth embodiment of the invention has basically the same structure as that of the third embodiment. Thus, the image processing system of the fourth embodiment likewise has the structure, e.g., shown in FIG. 28.

The image processing system of the fourth embodiment differs from the third embodiment in processing which is executed by CPU 101 of MFP 100C as described before with reference to FIGS. 30-32.

Figure 34:
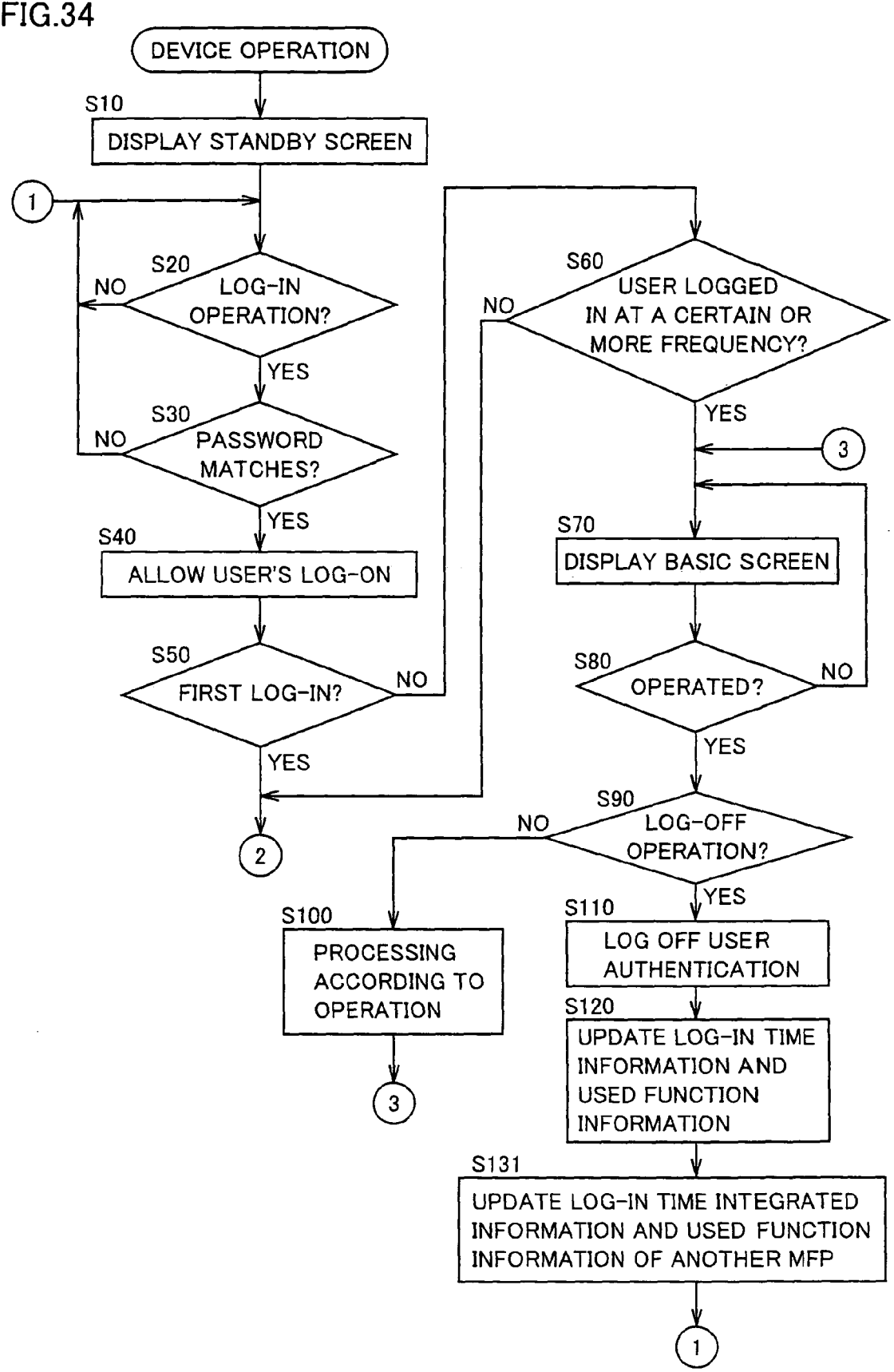
FIGS. 34, 35 and 36 are flowcharts of device execution processing of a CPU in an MFP forming an image processing system of a fourth embodiment of the invention.
Figure 35:
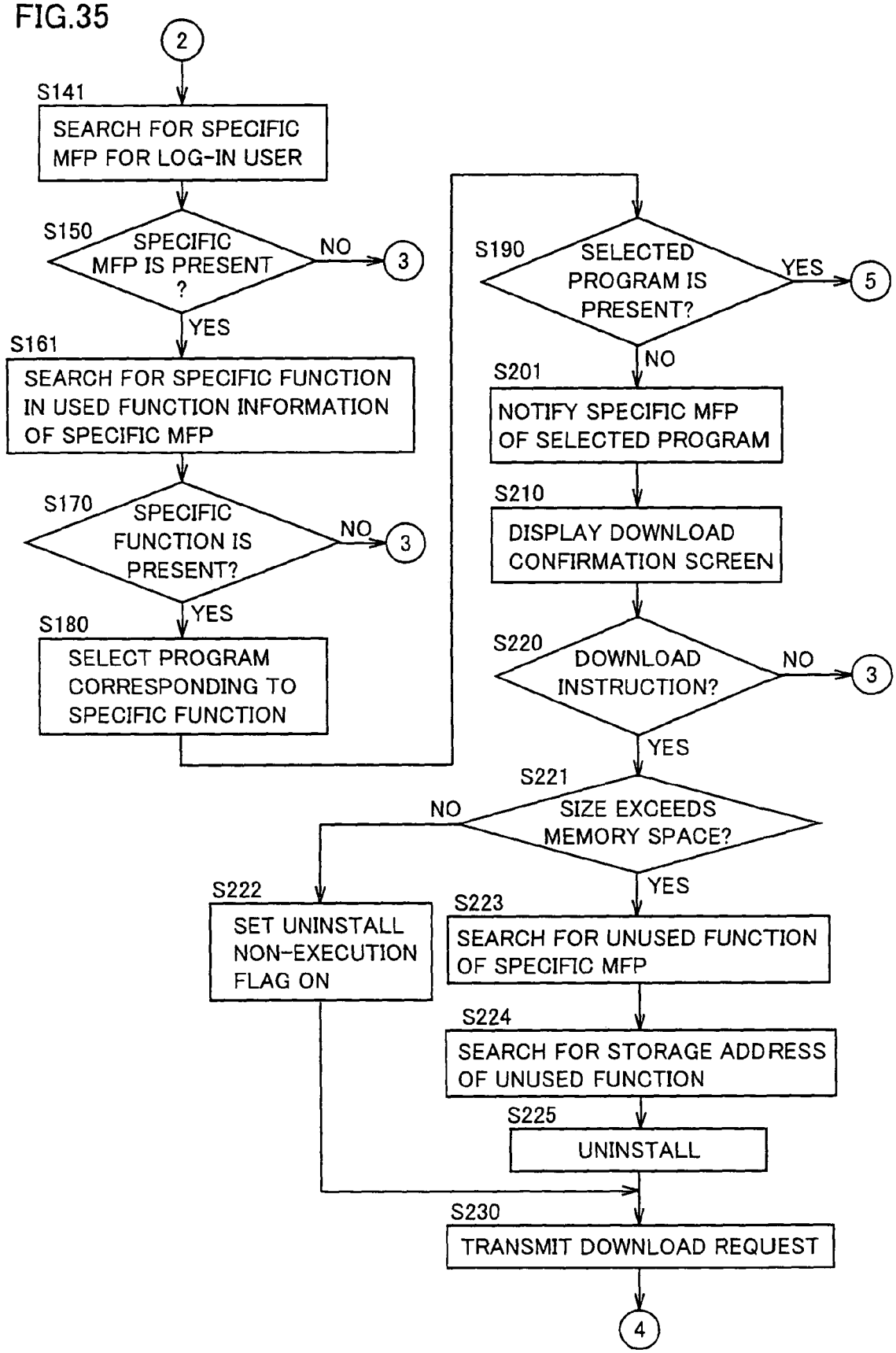
Figure 36:
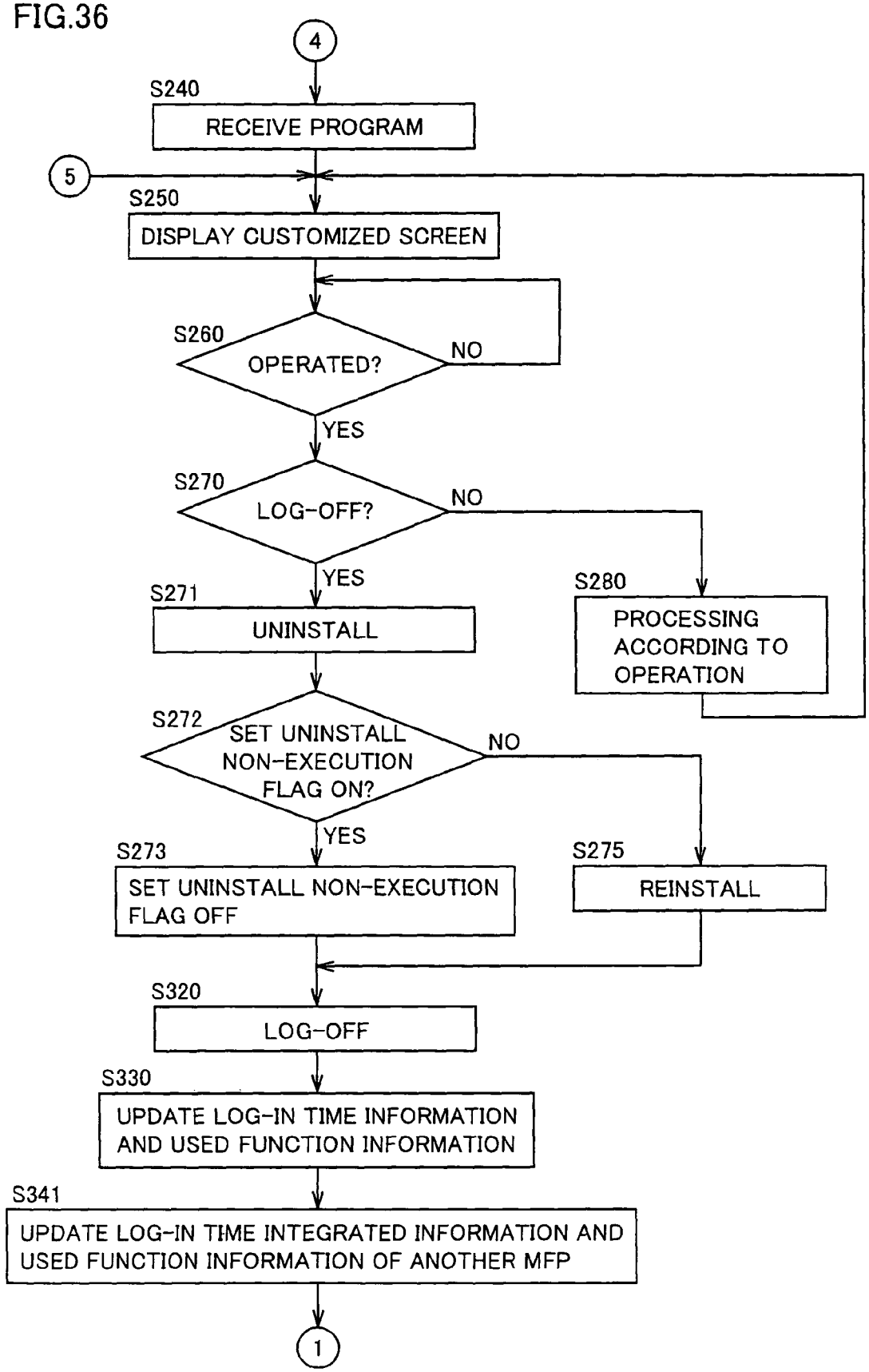

Referring to FIGS. 34-36, description will now be given primarily on a difference in processing executed by MFP 100C between the fourth and third embodiments. FIGS. 25-27 are flowcharts of the device executing processing which is executed when CPU 101 of MFP 100C of the fourth embodiment operates according to the user's operation on input keys 132 of MFP 100C.

After executing the processing from step S10 to step S210 (see FIGS. 34 and 35), CPU 101 displays the download confirmation screen (see FIG. 17), and determines in step S220 whether the user performed the operation of instructing the download of the program for at least one of the specific functions. When CPU 101 determines that the operation for such instruction was performed, it advances the process to step S221. When the determined operation indicates that the user does not wish the download of the program form the specific function, the process proceeds to step S70 similarly to the third embodiment.

When the user intends to store further the program for implementing the function selected on download confirmation screen 800, CPU 101 determines in step S221 whether the required space exceeds the memory space of program storing unit 156 (storing unit 107 and RAM 103) or not, i.e., whether there is an available space for storing the program implementing the function selected on download confirmation screen 800. When CPU 101 determines that the required space exceeds the memory spaces in storing unit 107 and RAM 103, it advances the process to step S223. Otherwise, it advances the process to step S222.

In step S223, CPU 101 refers to the number of times of use of each function in the used function information of the foregoing specific MFP, and thereby searches for the unused function in the specific MFP. The unused function is the function which was used 0 times.

In step S224, CPU 101 searches for the storage address of the program, which implements the above unused function, in the MFP which is currently logged in by the user.

In step S225, CPU 101 downloads the program of the unused function, i.e., the program stored in the storage address determined in step S224 into the specific MFP, and thereafter uninstalls it from its own device. Then, the process proceeds to step S230.

In step S222, CPU 101 sets the uninstall non-execution flag in RAM 103 and others, and advances the process to step S231. Thereafter, CPU 101 in this embodiment performs processing from step S231 to step S280 (or step S270) (see FIGS. 35 and 36) substantially in the same manner as the third embodiment.

As illustrated in FIG. 36, CPU 101 determines whether the operation, which is performed on input keys 132 and is detected in step S260, is the operation for the log-off or not. When it is the operation for the log-off, the process proceeds to step S271.

In step S271, CPU 101 uninstalls the program received in step S240, and advances the process to step S272.

In step S272, CPU 101 determines whether the uninstall non-execution flag, which is to be turned ON in step S222, is set or not. When it is set, the process proceeds to step S273. When the uninstall non-execution flags is already reset, the process proceeds to step S275.

In step S275, CPU 101 executes the processing of reinstalling the program which was uninstalled in step S225, and advances the process to step S320. More specifically, CPU 101 requests in step S275 the download of the program, which was uninstalled in step S225, to a different MFP on the image processing system storing the program in question. When this different MFP receives the information requesting the download of the program from CPU 101, it executes the processing in steps SB101-SB103 illustrated in FIG. 33, and transmits the download-requested program to MFP 100C. CPU 101 of MFP 100C receiving the program installs it.

In step S273, CPU 101 of this embodiment executes the processing from step S320 to step S341 similarly to CPU 101 in the first embodiment.

According to the embodiment already described, when a certain user wishes the download of the program which implements the function used in a different MFP on the system, and particularly when RAM 103 and storing unit 107 of MFP 100C do not have sufficient memory spaces, a part of the programs already stored in MFP 100C are uninstalled. The uninstalled program(s) can be downloaded from another MFP in the image processing system when the above certain user enters the information requesting the log-off via input keys 132, and the program thus downloaded can be installed in MFP 100C again.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing system having a plurality of image processing devices connected through a network, comprising
an authenticating unit performing user authentication for each one of the plurality of image processing devices,
an authentication time storing unit storing for users a number of times that each user logs into each one of the plurality of image processing devices of said image processing system,
a searching unit searching the network for a specific image processing device in which the logged-in user has previously logged into at least a predetermined number of times from the plurality of image processing devices based on a number of log-in times stored in the authentication time storing unit,
a specifying unit specifying an image processing function previously used by the logged-in user at the specific image processing device,
a download request processing unit downloading a program for the specified function of the specific image processing device to the respective image processing device on which the user is logged-in over the network, and
a function implementing unit causing the respective image processing device to implement the specified function of the downloaded program on the respective image processing device.

2. A non-transitory computer readable medium for a respective image processing device of an image processing system that includes a plurality of image processing devices, the computer readable medium having a computer program recorded thereon, which when loaded onto the respective image processing device causing said respective image processing device to execute the steps of:
performing a user authentication;
storing a number of times that a user logs into the respective image processing device of said image processing system;
searching the network for a specific image processing device on the network in which the logged-in user has previously logged into at least a predetermined number of times from the plurality of image processing devices based on a number of log-in times stored in the authentication time storing unit;
specifying an image processing function previously used by the logged-in user at the specific image processing device;
downloading a program for the specified function of the specific image processing device over the network; and
implementing the image processing function of the downloaded program on the respective image processing device.

3. The computer readable medium according to claim 2, further causing the respective image processing device to execute the steps of:
storing, for each of the users, the number of times of execution of each of the image processing functions, and the image processing function of the most stored times is specified as said specific image processing function in said step of specifying the image processing function.

4. The computer readable medium according to claim 2, further causing the respective image processing device to execute the steps of:
storing a program; and
installing a program for implementing said specific image processing function, and thereby implementing said specific image processing function of the user already logging in according to said user authentication.

5. The computer readable medium according to claim 4, further causing the respective image processing device to execute the step of:
uninstalling the program implementing said specific image processing function after log-off of the user already logging in according to said user authentication.

6. The computer readable medium according to claim 2, wherein said respective image processing device is connected to the information processing device over a network, and said information processing device specifies said specific image processing function.

7. An image processing device that is included in an image processing system having a plurality of image processing devices, the image processing device comprising: an authenticating unit performing user authentication;
a searching unit searching for a specific image processing device that a log-in user had logged into a predetermined number of times or more based on a number of times that the user logged into each of the image processing devices of said image processing system;
a specifying unit specifying an image processing function previously used by the logged-in user in the specific image processing device of the plurality of image processing devices;
a download request processing unit downloading a program for the specified function of the specific image processing device; and
a function implementing unit causing the image processing device on which the user is logged in to implement the image processing function of the downloaded program on the respective image processing device.

8. The image processing device according to claim 7, further comprising:

a function executing unit executing the image processing function implemented by said function implementing unit, wherein said function executing unit executes the plurality of image processing functions, and includes a used time storing unit storing for each of the users the number of times of execution of each of the image processing functions, and said function specifying unit specifies the image processing function stored the most times in said used time storing unit as said specific image processing function.

9. The image processing device according to claim 7, wherein, said image processing device is connected to an information processing device over a network, and said information processing device includes said function specifying unit.

10. The image processing device according to claim 7, further comprising:
a program storing unit storing a program, wherein said function implementing unit installs a program for implementing said specific image processing function in said program storing unit, and thereby implements said specific image processing function of the user already logging in said authenticating unit.

11. The image processing device according to claim 10, wherein said function implementing unit uninstalls the program implementing said specific image processing function after the user already logging in said authentication unit logs off said authenticating unit.

12. The image processing device according to claim 11, further comprising: an input unit for inputting information, wherein said function implementing unit uninstalls the program implementing said specific image processing function in response to the input of information instructing uninstall of said program.

13. The image processing device according to claim 10, wherein when an available space of said program storing unit is smaller than a size of the program implementing said specific image processing function, said function implementing unit uninstalls a part of the stored program for increasing the available space to or above the size of the program implementing said specific image processing function.

14. The image processing device according to claim 13, wherein said function implementing unit reinstalls the previously uninstalled program when the user logs off said authenticating unit.

15. A non-transient computer readable medium for an image processing system that includes a plurality of image processing devices, the computer readable medium having a computer program recorded thereon, which when loaded onto the plurality of image processing devices causes each of said image processing devices to execute the steps of:
performing user authentication;
storing a number of times that a user logs into the respective image processing device of said image processing system searching the network for a specific image processing device in which the logged-in user has previously logged into at least a predetermined number of times from the plurality of image processing devices based on a number of log-in times stored in the authentication time storing unit;
specifying an image processing function previously used by the logged-in user at the specific image processing device;
downloading a program for the specified function of the specific image processing device over the network; and
implementing the image processing function of the downloaded program on the respective image processing device.

16. The image processing system of claim 1, further having:
a server;
wherein the server has the authentication time storing unit, and each of the image processing devices has the authenticating unit, the searching unit, the specifying unit, the download request processing unit and the function implementing unit, and
wherein the searching unit searches for the specific image processing device based on the authentication time storing unit in the server.

17. The image processing system of claim 1, wherein each of the image processing devices has the authenticating unit, the authentication time storing unit, the searching unit, the specifying unit, the download request processing unit and the function implementing unit, and
wherein the authentication time storing unit stores the number of times that the user logged in other image processing devices.

18. The image processing device of claim 7, further comprising:
an authentication time storing unit storing the number of times that the user logged in each of the image processing devices of said image processing system for each of the users,
wherein the searching unit searches for the specific image processing device based on the number of times stored in a server while stores the number of times of each authentication time storing units of a plurality of the image processing devices.

19. The image processing device of claim 7, further comprising;
an authentication time storing unit storing the number of times that the user logged in each of the image processing devices of said image processing system for each of the users,
wherein the authentication time storing unit stores the number of times that the user logged in other image processing devices.

* * * * *